United States Patent
Sukegawa et al.

(10) Patent No.: US 7,377,261 B2
(45) Date of Patent: May 27, 2008

(54) SPARK IGNITION ENGINE AND METHOD OF CONTROLLING COMBUSTION OF THE ENGINE

(75) Inventors: Yoshihiro Sukegawa, Hitachi (JP); Noboru Tokuyasu, Hitachinaka (JP); Junichi Yamaguchi, Tokai (JP); Hiroshi Fujii, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 174 days.

(21) Appl. No.: 10/568,184

(22) PCT Filed: Aug. 15, 2003

(86) PCT No.: PCT/JP03/10374

§ 371 (c)(1),
(2), (4) Date: Feb. 13, 2006

(87) PCT Pub. No.: WO2005/017348

PCT Pub. Date: Feb. 24, 2005

(65) Prior Publication Data

US 2006/0219216 A1 Oct. 5, 2006

(51) Int. Cl.
*F02P 5/00* (2006.01)
*F02B 17/00* (2006.01)

(52) U.S. Cl. .................. 123/406.55; 123/295

(58) Field of Classification Search .......... 123/406.55, 123/406.45, 301, 305, 299
See application file for complete search history.

(56) References Cited

U.S. PATENT DOCUMENTS 4,852,529 A * 8/1989 Vowles .................... 123/143 B
7,185,631 B2 * 3/2007 Takeda et al. .......... 123/406.11

FOREIGN PATENT DOCUMENTS

| JP | 63-131865 A | * | 6/1988 |
| JP | 7-83043 | | 3/1995 |
| JP | 7-197808 | | 8/1995 |
| JP | 8-1193 | | 7/1996 |
| JP | 8-232645 | | 9/1996 |
| JP | 9-125944 | | 5/1997 |
| JP | 11-166410 | | 6/1999 |
| JP | 11-294157 | | 10/1999 |
| JP | 2003-83128 | | 3/2003 |
| JP | 2003-193841 | | 7/2003 |
| JP | 2003-214235 | | 7/2003 |

* cited by examiner

*Primary Examiner*—Hieu T. Vo
(74) *Attorney, Agent, or Firm*—Mattingly, Stanger, Malur & Brundidge, P.C.

(57) ABSTRACT

In warming up operation when the temperature of an engine is low, heat release in a combustion chamber is delayed by making ignition timing immediately before the top dead center of compression stroke or later. Hereby, exhaust gas including a large quantity of unburned HC, oxygen and carbon monoxide is exhausted into an exhaust passage. Then, the mixture of the HC, oxygen and carbon monoxide is accelerated by a turbulence generating means for generating turbulence in an exhaust flow mounted in the exhaust passage. Hereby, the HC is combusted in the exhaust passage, exhaust temperature is raised, resulting in that effective reduction of the HC. As the exhaust temperature is raised, it can activate earlier a catalytic converter for purifying exhaust.

36 Claims, 29 Drawing Sheets

INTAKE STROKE

COMPRESSION STROKE
(FUEL INJECTION TIMING)

COMPRESSION STROKE
(BTDC)

COMPRESSION STROKE
(IGNITION TIMING)

COMPRESSION STROKE
(BTDC)

COMPRESSION STROKE
(IGNITION TIMING)

COMPRESSION STROKE
(BTDC)

COMPRESSION STROKE
(IGNITION TIMING)

INTAKE STROKE

COMPRESSION STROKE

IGNITION

EXHAUST STROKE

WITHOUT TURBULENCE
GENERATING TOOL
(CONVENTIONAL TYPE)

PROVIDED WITH
TURBULENCE
GENERATING TOOL
(THIS INVENTION)

SPARK IGNITION ENGINE AND METHOD OF CONTROLLING COMBUSTION OF THE ENGINE

TECHNICAL FIELD

The present invention relates to a spark ignition engine and a method of controlling the combustion of the engine, particularly the ones reducing effectively the outside discharge of unburned hydrocarbon (HC) during a warming up operation in which the temperature of the engine is low, and activating promptly an exhaust catalyst.

BACKGROUND ART

When a spark ignition engine is started, particularly when the temperature of an engine is low (when the engine is cold), injected fuel collides with the wall of a low-temperature intake passage, an intake valve, the wall of a combustion chamber and the crown face of a piston, and a large quantity of fuel droplet films are formed on the collided wall. As the fuel droplet film on the low-temperature wall is hardly vaporized, combustion is deteriorated and a large quantity of HC may be exhausted in exhaust gas. Besides, as a catalyst is not activated yet when the engine is cold, the purified efficiency of exhaust gas by the catalyst is low and exhaust is deteriorated (increasing the discharge of injurious ingredients such as HC).

To save such a situation, it is known, as disclosed in JP Patent Publication (Kokai) No.11-294157A (1999) for example, that the direct injection-type spark ignition engine provided with a capacity part in an exhaust manifold where fuel is injected into a combustion chamber at an expansion stroke, exhaust stays in the capacity part of the exhaust manifold to make HC in the exhaust gas combusted and raise the temperature of the exhaust.

In order to raise up the temperature of a catalytic converter to activating temperature as quickly as possible when an engine is cold, it is desirous to dispose the catalytic converter close a combustion chamber, the exhaust temperature of which is high. However, provided with the capacity part to the exhaust manifold as an engine disclosed in the above-mentioned patent document, it is difficult to dispose a catalytic converter close to the combustion chamber. Besides, as the capacity part makes its heat capacity of gas larger, it takes more time to raise the exhaust gas temperature immediately after the engine is started.

Further, the capacity part of the exhaust manifold may cause exhaust interference resulting in decrease of the maximum power output of the engine.

The invention is made to solve such a problem and the aim of the invention is to provide a spark ignition engine and a method of controlling the combustion of the engine wherein in warming up in which the temperature of the engine is low, the outside discharge of HC can be effectively reduced, a catalyst can be promptly activated and further, the generation of soot, the fluctuation of revolution and the fluctuation of torque can be also inhibited.

DISCLOSURE OF THE INVENTION

To achieve the above-mentioned aim, the spark ignition engine according to the invention is characterized in that it is provided with combustion control means for controlling ignition timing on an ignition plug and turbulence generating means for generating turbulence in an exhaust flow in an exhaust passage, and the combustion control means makes ignition timing immediately before the top dead center of a compression stroke or later when the temperature of the engine is lower than the predetermined temperature.

As heat release in a combustion chamber is delayed when ignition timing is made immediately before the top dead center of a compression stroke or later, which is later than the timing for normal operation (for example, 10° CA before the top dead center or later than 10° CA for warming up, whereas approximately 30° CA before the top dead center for normal operation) in warming up operation in which the temperature of the engine is low as described above, unburned HC, oxygen and carbon monoxide are much included in exhaust (exhaust gas), however, the mixture of HC, oxygen and carbon monoxide is accelerated by turbulence generating means in the exhaust passage for generating turbulence in an exhaust flow, and the oxidization (the combustion) of HC is rapidly proceeded in the exhaust passage. Hereby, exhaust temperature rises and simultaneously HC can be effectively reduced and further rise of the temperature of exhaust gas activate early a catalytic converter for purifying exhaust.

A desirable embodiment is the one further provided with fuel stratifying means for stratifying fuel in the combustion chamber where the combustion control means instructs the fuel stratifying means to stratify fuel in the combustion chamber when the temperature of the engine is lower than the predetermined temperature.

Besides, another desirable embodiment is the one provided with a fuel injection valve for directly injecting fuel into the combustion chamber where the combustion control means instructs the fuel injection valve to inject fuel at a compression stroke when the temperature of the engine is lower than the predetermined temperature.

As described above, by injecting fuel at the compression stroke and stratifying the fuel in the combustion chamber, excessive rich air-fuel mixture is generated around the ignition plug at ignition timing and relatively lean air-fuel mixture is generated in the periphery of the combustion chamber apart from the ignition plug. Therefore, the air-fuel mixture is not completely combusted in the combustion chamber at an expansion stroke and exhaust stroke, exhaust gas including much HC, carbon monoxide (CO), hydrogen ($H_2$) and oxygen ($O_2$) is exhausted into the exhaust passage at the exhaust stroke. A turbulence generating means in the exhaust passage accelerate the mixture of HC, CO, $H_2$ and $O_2$ exhausted into the exhaust passage to cause the rapid oxidization (the combustion) of HC. As a result, exhaust temperature in the exhaust passage rises and the concentration of HC reduces. Hereby, the concentration of HC in warming up operation is reduced, and due to the high-temperature exhaust gas the temperature of the catalytic converter can be raised up early to the temperature at which exhaust purification efficiency is high (activation temperature).

Another desirable embodiment of the spark ignition engine according to the invention is the one provided with ignition timing control means for controlling ignition timing on an ignition plug, a fuel injection valve for directly injecting fuel into the combustion chamber and fuel injection control means for controlling fuel injection timing by the fuel injection valve, where the penetration of fuel spray injected from the fuel injection valve in the direction of the ignition plug is made longer than the penetration in the direction of a piston, the fuel injection control means instructs the fuel injection valve to inject fuel in the second half of the compression stroke to make the air-fuel ratio in the vicinity of the theoretical one and the ignition timing control means makes ignition timing immediately before the top dead center of compression stroke or later, when the temperature of the engine is lower than the predetermined temperature.

As described above, air-fuel mixture richer than the theoretical air-fuel ratio can be generated around the ignition plug by making penetration on the side of the piston shorter than penetration on the side of the ignition plug, inhibiting the formation of a droplet film (the adhesion of fuel) on the piston and hereby preventing it from generating soot (smoke). Even if ignition timing is considerably delayed, stable combustion is acquired. As rich air-fuel mixture concentrates around the ignition plug, combustion is delayed and HC is oxidized and combusted in the exhaust passage. Hereby, exhaust temperature rises, HC decreases, and the temperature of the catalytic converter can be promptly raised up to activation temperature.

Further another desirable embodiment of the spark ignition engine according to the invention is the one provided with ignition timing control means for controlling ignition timing on the ignition plug, a fuel injection valve for directly injecting fuel into the combustion chamber, fuel injection control means for controlling fuel injection timing on the fuel injection valve and longitudinal vortex generating means for generating a forward longitudinal vortex in the combustion chamber, where the longitudinal vortex generating means generates a forward longitudinal vortex in the combustion chamber, the fuel injection control means instructs the fuel injection valve to inject fuel in the second half of the compression stroke so that the air-fuel ratio is in the vicinity of the theoretical one, and the ignition timing control means makes ignition timing immediately before the top dead center of compression stroke or later, when the temperature of the engine is lower than the predetermined temperature.

As described above, the adhesion of fuel to the piston is further reduced by generating the forward longitudinal vortex in the combustion chamber and rich air-fuel mixture can be easily concentrated around the ignition plug. Hereby, the generation of soot is inhibited, ignition timing can be further delayed, and hereby, the further rise of exhaust temperature and the reduction of HC are enabled.

Further another desirable embodiment of the spark ignition engine according to the invention is the one provided with ignition timing control means for controlling ignition timing on the ignition plug, a fuel injection valve for directly injecting fuel into the combustion chamber, fuel injection control means for controlling fuel injection timing on the fuel injection valve and longitudinal vortex generating means for generating a forward longitudinal vortex in the combustion chamber, where the penetration of fuel spray injected from the fuel injection valve in the direction of an ignition plug is made longer than the penetration in the direction of a piston, when the temperature of the engine is lower than the predetermined temperature, the longitudinal vortex generating means generates the forward longitudinal vortex in the combustion chamber, the fuel injection control means instructs the fuel injection valve to inject fuel at least in the second half of the compression stroke so that the air-fuel ratio is in the vicinity of the theoretical one, and the ignition timing control means makes ignition timing immediately before the top dead center of compression stroke or later.

Multiplier effect by the combination of the followings is acquired by keeping the penetration of fuel spray in a specific form as described above and generating the forward longitudinal vortex, the adhesion of fuel to the piston can be further inhibited, and rich air-fuel mixture around the ignition plug can be more securely generated.

Further another desirable embodiment is the one provided with a longitudinal vortex controlling means for controlling the strength of a forward longitudinal vortex generated in the combustion chamber and a fluctuation detecting means for detecting the magnitude of the fluctuation of engine speed or torque fluctuation, where the longitudinal vortex controlling means controls the strength of the longitudinal vortex so that the magnitude of the fluctuation of engine speed or torque fluctuation is a predetermined value or thereunder, and the ignition timing control means delays ignition timing to the extent possible.

As described above, ignition timing can be more delayed by controlling the strength of the longitudinal vortex in the combustion chamber so that the fluctuation of engine speed or torque fluctuation is the predetermined value or thereunder, so as to enable to further delay ignition timing, resulting in the rise of exhaust temperature and more efficient reduction of HC.

Further another desirable embodiment is the one provided with an ignition timing control means for controlling ignition timing on the ignition plug, a fuel injection valve for directly injecting fuel into the combustion chamber, a fuel injection control means for controlling fuel injection timing by the fuel injection valve, a fuel pressure controlling means for controlling the pressure of fuel supplied to the fuel injection valve and a fluctuation detecting means for detecting the magnitude of the fluctuation of engine speed or torque fluctuation, where the fuel injection control means instructs the fuel injection valve to inject fuel at least in the second half of the compression stroke so that the air-fuel ratio is in the vicinity of the theoretical air-fuel ration, the fuel pressure controlling means controls fuel pressure so that the magnitude of the fluctuation of engine speed or torque fluctuation is the predetermined value or smaller, and the ignition timing control means delays ignition timing to the extent possible, when the temperature of the engine is lower than the predetermined temperature.

As described above, ignition timing can be further delayed by controlling the pressure of fuel so that the fluctuation of engine speed or torque fluctuation is the predetermined value or thereunder, and the rise of exhaust temperature and the reduction of HC can be more efficiently executed.

In addition, further another desirable embodiment of the spark ignition engine according to the invention is the one, as described above, provided with a turbulence generating means. The turbulence generating means is desirably disposed in the exhaust passage, generating forcibly turbulence in an exhaust flow and increasing it to the extent possible, and may be configured by plural rods or plates arranged in parallel crossing the exhaust passage, for example, or in the form of a grid or a cobweb. In such a case, an interval between the component members is narrower on the side of the inner wall than that in the center of the exhaust passage.

The turbulence generating means may also be configured by plural projections protruded inwardly from the inner wall of the exhaust passage, annular members or a step provided on the inner wall of the exhaust passage, or may be integrated with a gasket arranged between the exhaust passage (the exhaust manifold) and a cylinder head, or may be held between gaskets or adjacent to the gasket.

BEST MODE FOR CARRYING OUT THE INVENTION

Figure 1:
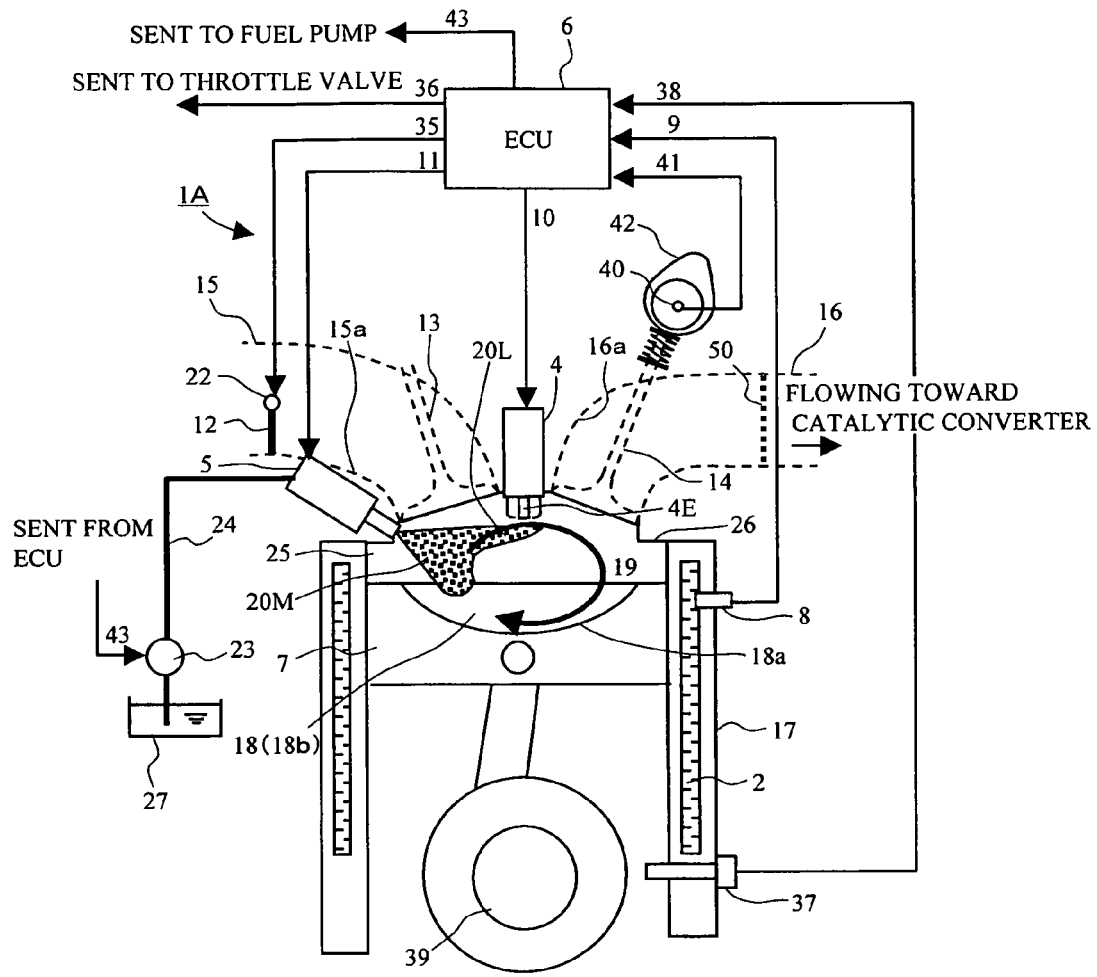
FIG. 1 is a schematic block diagram showing the first embodiment of a spark ignition engine according to the invention.

Referring to the drawings, some embodiments for embodying the invention will be described below.

First Embodiment

Figure 2:
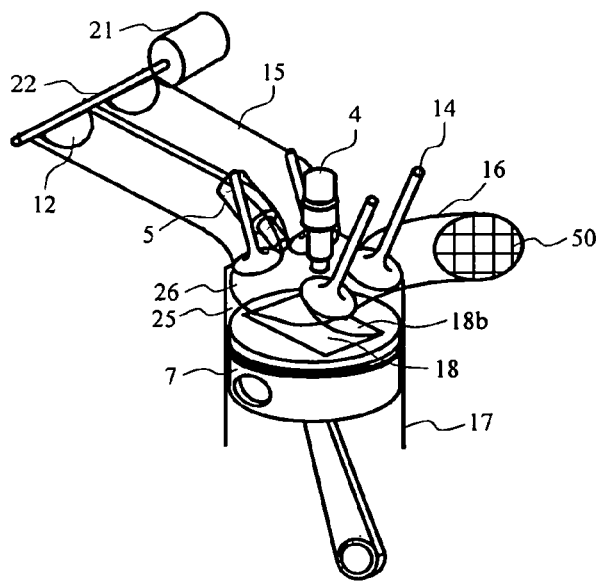
FIG. 2 is a perspective view showing the circumference of a combustion chamber of the engine shown in FIG. 1.

FIG. 1 shows the whole configuration of the first embodiment of a direct injection-type spark ignition engine according to the invention. FIG. 2 is a perspective drawing showing the circumference of a combustion chamber of the engine shown in FIG. 1.

In the indirect injection-type spark ignition engine 1A shown in FIGS. 1 and 2, the combustion chamber 25 is configured by a cylinder head 26, a cylinder block 17 and a piston 7 inserted into the cylinder block 17 so that the piston can be slid. A concave groove 18 having a bottom (a cylindrical face) 18a the section of which is in the shape of a circular arc and a crescent-shaped or semicircular side 18b is provided to a crown face of the piston 7.

Intake ports 15a of two intake passages 15 and exhaust ports 16a of two exhaust passages 16 are open to the combustion chamber 25. Intake valves 13 and exhaust valves 14 are arranged in each of the intake ports 15a of the intake passages 15 and in each of the exhaust ports 16a of the exhaust passages 16 to open and close them.

A fuel injection valve 5 is made opposite to the side of the intake port 15a in the combustion chamber 25 and fuel is directly injected into the combustion chamber 25 via the fuel injection valve 5. The fuel injection valve 5 is arranged between the two intake ports 15a and is attached in a state in which the fuel injection valve is inclined based upon the central axis of the combustion chamber 25. An angle between the central axis of the combustion chamber 25 and the central axis of the fuel injection valve 5 is 50 to 70° for example. A fuel tank 27 and a fuel pump 23 are connected to the fuel injection valve 5 via a fuel piping 24. The fuel pump 23 pressurizes fuel supplied from the fuel tank 27 to also inject fully atomized fuel via the fuel injection valve 5 when pressure in the combustion chamber 25 is high. Fuel pressure at this time is 3 to 12 MPa for example and Sauter's mean diameter of fuel spray injected via the fuel injection valve 5 is 15 to 30 μm for example.

The pressure pressurized by the fuel pump 23 of fuel can be arbitrarily controlled in a range of 3 to 12 MPa for example by a fuel pressure control signal 43 from an engine control unit (ECU) 6.

An ignition plug 4 is provided to the center of the ceiling of the combustion chamber 25 and its electrode 4E is protruded toward the inside of the combustion chamber 25. As for the structure of the electrode 4E of the ignition plug 4, a surface type or a semi-surface type is desirable from a viewpoint that its stain resistance is high. As the structure of the ignition plug in the surface type or the semi-surface type is already widely known, the detailed description is omitted in this case.

Electrical energy is supplied to the ignition plug 4 by an ignition coil not shown, is discharged from the electrode 4E to ignite air-fuel mixture, however, it is desirable to acquire the stable ignition of rich air-fuel mixture and the high stain resistance of the electrode 4E that as high electrical energy as possible is supplied to the ignition plug 4 at this time. Electrical energy supplied to the ignition plug 4 is 70 to 110 mJ for example.

Electrical energy supplied from the ignition coil to the ignition plug 4 may be also divided into plural times. For example, electrical energy of total 100 mJ is divided in two, electrical energy of 30 mJ is discharged first, and electrical energy of the residual 70 mJ is discharged next. An interval between the first discharge time and the second discharge time is 1 msec for example.

A catalytic converter not shown is provided on the downstream side of the exhaust passage 16. For the catalytic converter, a three-way catalytic converter, an NOx absorption catalytic converter, an HC absorption catalytic converter and others can be used. Plural catalytic converters different in types may be also combined. One catalytic converter provided with the functions of the plural catalytic converters (a hybrid catalytic converter) may be also used.

It is desirable to prevent exhaust temperature from lowering by heat conduction to the wall of the exhaust passage 16 that the exhaust passage 16 is formed in double structure and is thinned, for example.

Figure 57:
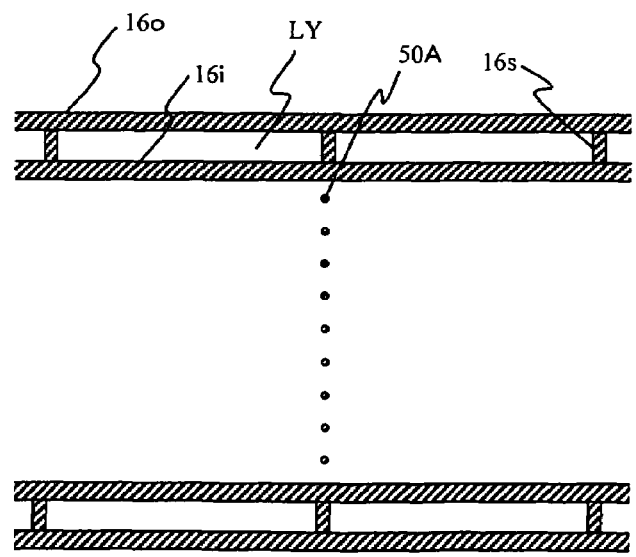
FIG. 57 is a sectional view showing an exhaust passage having double tube structure.

The exhaust passage in double structure is structure in which a tube wall 16o is further provided on the outside of an inside tube 16i (the exhaust passage) via an air layer LY as shown in FIG. 57, adiabatic effect is enhanced by the air layer LY, and exhaust temperature is hardly lowered. Besides, as the convective heat transfer of air is prevented by vacuumizing in the air layer between the double tubes, adiabatic effect is further enhanced.

The thinned exhaust passage reduces the heat capacity of the exhaust passage, compared with that of a normal exhaust passage and enables readily raising the temperature by the heat of exhaust. In any case, the lowering of exhaust temperature can be inhibited by raising the temperature of the exhaust passage.

Besides, a throttle valve is provided on the upstream side of the intake passage 15 though it is not shown and the quantity of air filled in the combustion chamber 25 is controlled by an aperture of the throttle valve. The throttle valve is electrically controlled and the aperture of the throttle valve is controlled by a throttle valve aperture signal 36 from the ECU 6.

A tumble generating valve 12 provided to generate a forward longitudinal vortex 19 (hereinafter called a forward tumble flow) in the combustion chamber 25 at an intake stroke for opening and closing a lower half of the intake passage 15 is provided in the intake passage 15. The tumble generating valve 12 is turned by a driving motor 21 directly coupled to its valve stem 22 and its aperture is controlled by a tumble generating valve aperture signal 35 supplied from the ECU 6 to the driving motor 21. When the tumble generating valve 12 is fully closed (the lower half of the intake passage 15 is completely closed), the strongest forward tumble flow is generated in the combustion chamber 25 and when the tumble generating valve 12 is turned by approximately 90 degrees from the fully closed state (in parallel with the flow of air), a forward tumble flow in the combustion chamber 25 is turned the weakest.

A turning angle signal 38 as a pulse signal from a turning angle sensor 37 which is output every fixed crank angle (for example, every 30° CA) and a reference position signal 41 as a pulse signal from a reference position sensor 40 which is output every 720° CA are input to the ECU 6. The ECU 6 detects engine speed Ne and a reference crank position based upon the turning angle signal 38 and the reference position signal 41.

In this embodiment, a turbulence generating tool 50 for generating turbulence in an exhaust flow in the exhaust passage 16 (in the exhaust manifold) and increasing the turbulence is provided. It is desirable that the turbulence generating tool 50 is attached in a position in which the temperature of exhaust gas exhausted from the combustion chamber 25 is high enough in warming up described later and the position is within approximately 500 mm in a downstream direction from the most upstream side (the exhaust port 16a) of the exhaust passage 16. Exhaust gas temperature in warming up in the position in which the turbulence generating tool 50 is attached is approximately 600° C. or higher.

Figure 4:
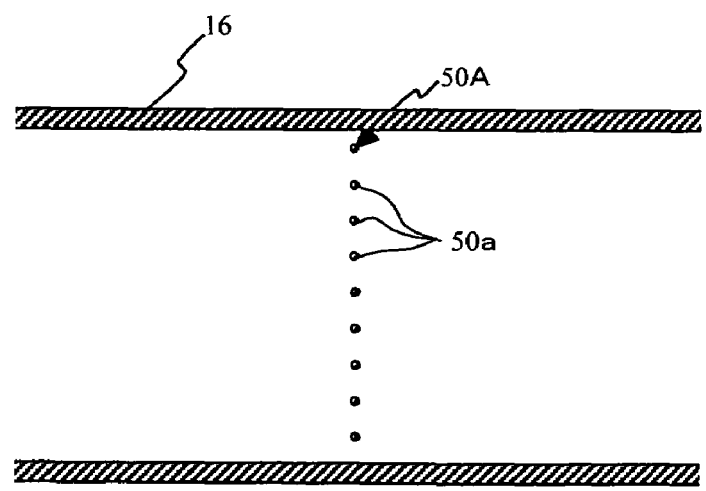
FIG. 4 is a sectional view viewed along the line A-A shown in FIG. 3.
Figure 5:
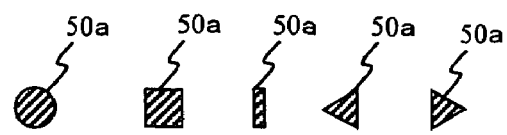
FIGS. 5A to 5E show the sectional forms of component members of the turbulence generating tool shown in FIG. 3.

Next, referring to FIGS. 3 to 5, the configuration of one example (50A) of the turbulence generating tool 50 used in this embodiment will be described.

Figure 3:
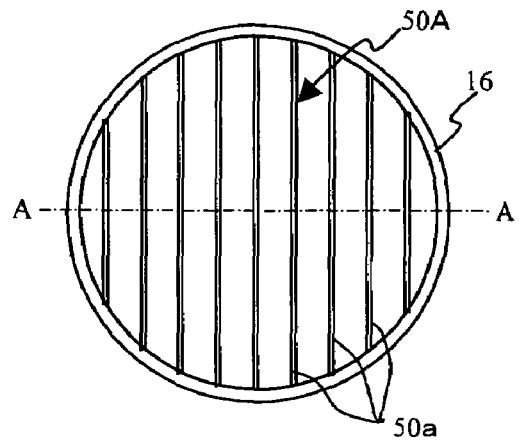
FIG. 3 is a sectional view showing a turbulence generating tool used in the first embodiment in an exhaust passage.

FIG. 3 shows a section of the part, to which a turbulence generating tool 50A is provided, of the exhaust passage 16. FIG. 4 shows a section viewed along line A-A shown in FIG. 3.

The turbulence generating tool 50A shown in the drawings are configured by plural rod members 50a arranged in parallel at an equal interval so that the plural rod members are perpendicular to (prevent) a flow of exhaust.

The sectional form of the rod member 50a may be any of a circle, a square, a rectangle and a triangle as shown in FIGS. 5A to 5E and rod members 50a (or plate members) having different sectional forms may be also combined.

As the turbulence generating tool 50A is exposed to high-temperature exhaust, it is desirable that it is formed by material, the melting point of which is 1500° C. or higher such as pure iron, carbon steel, stainless steel and a ceramic.

Next, a fuel injection valve 5 (5A, 5B, 5C) used in this embodiment and spray of fuel injected from it will be described.

Figure 6:
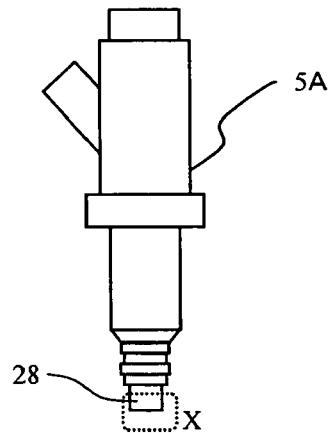
FIG. 6 is a side view showing one example of a fuel injection valve used in the first embodiment.
Figure 7:
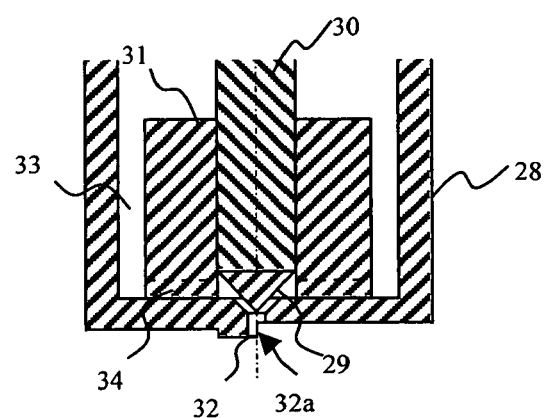
FIG. 7 is an enlarged view showing a main part of the fuel injection valve shown in FIG. 6.
Figure 8:
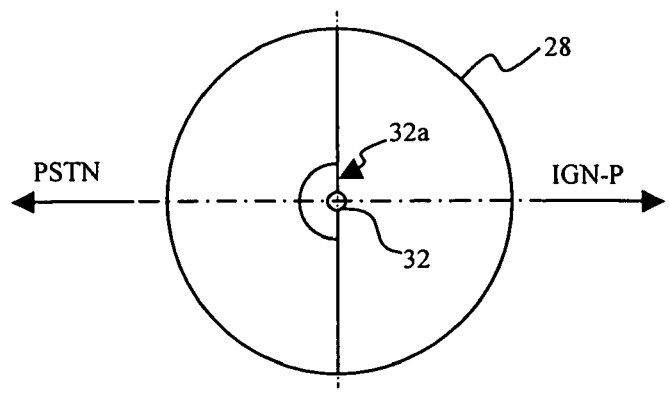
FIG. 8 is an enlarged bottom view showing the fuel injection valve shown in FIG. 6.

One example (5A) of the fuel injection valve 5, the whole of which is shown in FIG. 6, is provided with an injection nozzle 28 on the side of the end. Its section of a main part (a region X encircled by broken line shown in FIG. 6) is shown in FIG. 7 and the bottom of the main part is shown in FIG. 8. The injection nozzle 28 is provided with a conical valve 29, a plunger 30 connected to the conical valve 29, a swirler 31 for applying a swirl to spray, a nozzle hole 32, an axial groove 33 and a radial groove 34. The nozzle hole 32 provided to the end of the injection nozzle 28 is not symmetrical and a cutout 32a is provided to a part. In an example shown in the drawing, the cutout 32a is provided in a range of 180°.

When the conical valve 29 is opened, fuel flows into the axial groove 33 and the radial groove 34 and the fuel to which a swirl is applied by the swirler 31 is injected from the nozzle hole 32. As the cutout 32a is provided to the injection nozzle hole, lead spray 20L sprayed toward the ignition plug 4 and main spray 20M sprayed toward the piston 7 are formed as shown in FIG. 1.

As shown in FIG. 8, a direction shown by an arrow IGN-P is on the side of the ignition plug 4 and the direction shown by an arrow PSTN is on the side of the piston 7. That is, the lead spray 20L is sprayed toward the ignition plug 4 and the main spray 20M is sprayed toward the piston 7 respectively by installing the fuel injection valve 5 so that the cutout 32a of the nozzle hole 32 is directed to the side of the ignition plug 4.

Figure 9:
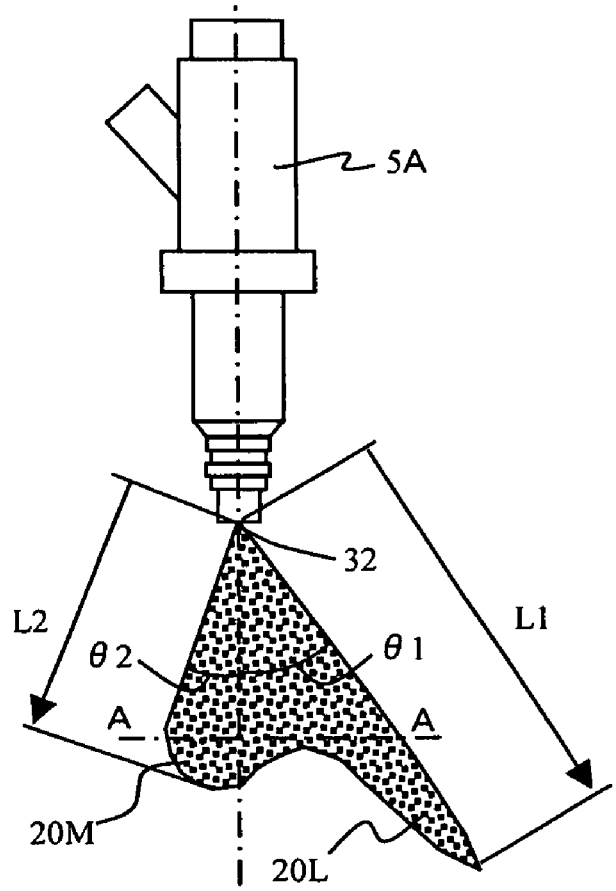
FIG. 9 is a side view showing the form of fuel spray injected from the fuel injection valve shown in FIG. 6.
Figure 10:
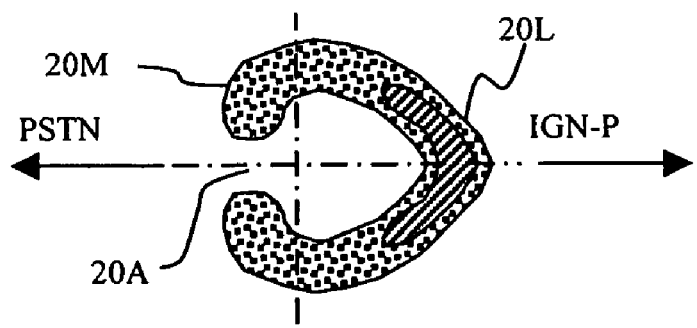
FIG. 10 is a sectional view viewed along line A-A shown in FIG. 9.

To explain this in detail referring to FIGS. 9 and 10 (sectional view along line A-A shown in FIG. 9), the form of fuel spray injected from the nozzle hole 32 of the fuel injection valve 5 is not symmetrical because of the cutout 32a provided with the injection nozzle. A spray angle θ1 of the lead spray 20L with a center line of the fuel injection valve 5 is set to 30° for example and a spray angle θ2 of the main spray 20M is set to 20° for example.

The sectional form of fuel spray has clearance 20A in a part of spray because of the cutout 32a provided with the nozzle hole 32. The flow-rate concentration of the lead spray 20L directed toward the ignition plug 4 is higher than that of the main spray 20M. Therefore, the penetration (the blown-off distance) L1 of the lead spray 20L is longer, compared with the penetration (the blown-off distance) L2 of the main spray 20M. The ratio L1/L2 of the penetration L1 of the lead spray 20L to the penetration L2 of the main spray 20M is 1.3 to 1.5 in this case.

The spray angle θ1 of the lead spray 20L and the spray angle θ2 of the main spray 20M can be variously changed depending upon the form of the cutout 32a provided with the nozzle hole 32.

Figure 11:
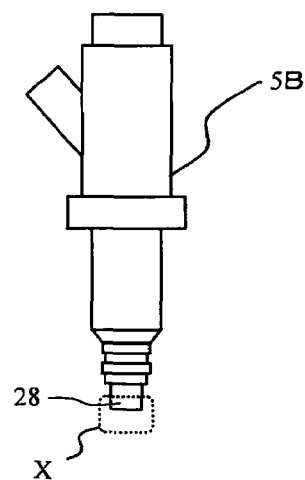
FIG. 11 is a side view showing another example of the fuel injection valve used in the first embodiment.
Figure 12:
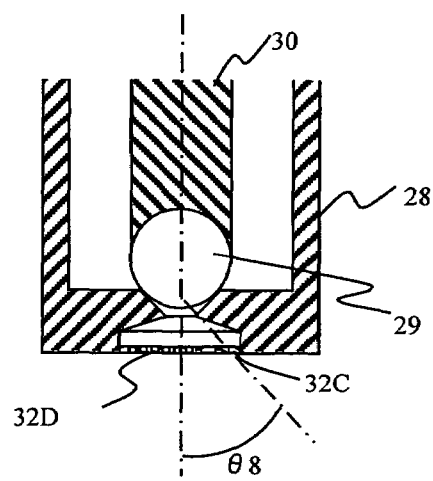
FIG. 12 is an enlarged view showing a main part of a fuel injection valve shown in FIG. 11.
Figure 13:
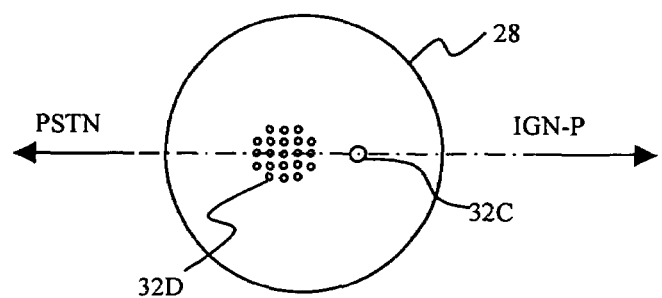
FIG. 13 is an enlarged bottom view showing the fuel injection valve shown in FIG. 11.

As the side of another example (5B) of the fuel injection valve 5 is shown in FIG. 11, the section of its main part (a region X encircled by broken line shown in FIG. 11) is shown in FIG. 12 and further, the bottom of the main part is shown in FIG. 13, an injection nozzle 28 of a fuel injection valve 5B has a structure provided with a fuel injection hole 32C for generating the lead spray 20L and a fuel injection hole 32D for generating the main spray 20M. The fuel injection hole 32C is inclined by an angle θ8 with the central axis of the fuel injection valve 5B so that the lead spray 20L is directed to an ignition plug electrode when the fuel injection valve is attached to the engine.

Besides, as shown in FIG. 13, the fuel injection hole 32C is formed so that the diameter is longer than that of the fuel injection hole 32D. Further, the fuel injection hole 32D has a short diameter, is provided with plural nozzle holes to inject an amount of fuel required for driving, and the spray concentration of the main spray 20M is diminished by dispersing their arranged positions.

Figure 14:
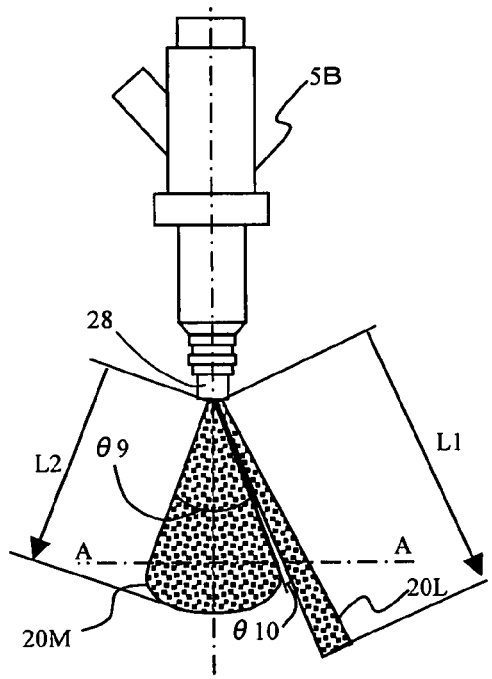
FIG. 14 is a side view showing the form of fuel spray injected from the fuel injection valve shown in FIG. 11.
Figure 15:
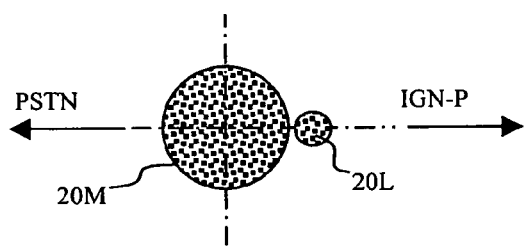
FIG. 15 is a sectional view viewed along line A-A shown in FIG. 14.

FIG. 14 is a side view showing the form of fuel spray injected from the fuel injection valve 5B and FIG. 15 is a sectional view along line A-A shown in FIG. 14.

As shown in these drawings, the form of the main spray 20M injected from the fuel injection hole 32D of the fuel injection valve 5B is uniform in a circumferential direction. The high-pressure lead spray 20L is injected from the injection hole 32C of the fuel injection valve 5B. An angle θ10 between the main spray 20M and the lead spray 20L is 0 to 10° for example.

As the concentration of the lead spray 20L injected from the injection hole 32C is higher, compared with the concentration of the lead spray 20L injected from the injection hole 32D, the penetration L1 of the lead spray 20L is longer, compared with the penetration L2 of the main spray 20M. The ratio L1/L2 of the penetration L1 of the lead spray 20L to the penetration L2 of the main spray 20M is 1.3 to 1.5 for example.

Figure 16:
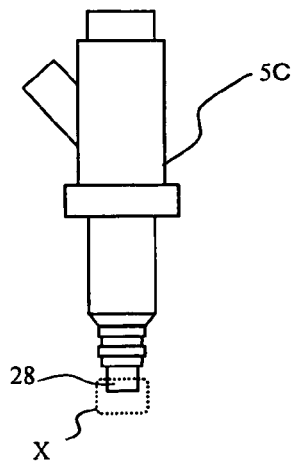
FIG. 16 is a side view showing another example of the fuel injection valve used in the first embodiment.
Figure 17:
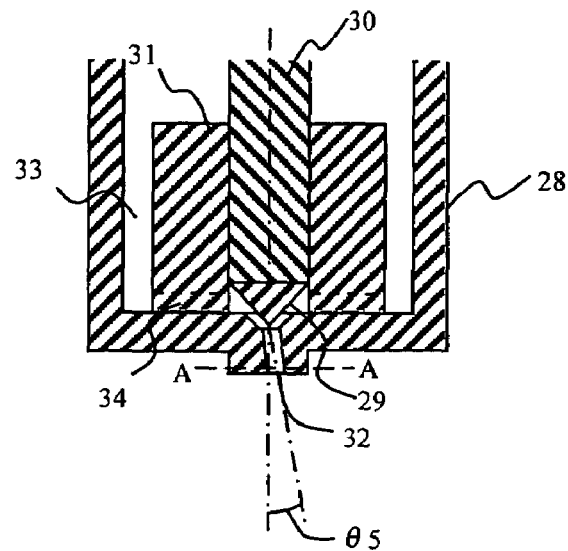
FIG. 17 is an enlarged view showing a main part of a fuel injection valve shown in FIG. 16.

FIG. 16 shows the whole of another example (5C) of the fuel injection valve 5 and FIG. 17 shows its main part (region X encircled by broken line in FIG. 16), where an injection nozzle 28 of a fuel injection valve 5C is provided with a conical valve 29, a plunger 30 connected to the conical valve 29, a swirler 31 for applying a swirl to spray, a nozzle hole 32, an axial groove 33 and a radial groove 34. In this example, an axial direction of the nozzle hole 32 formed on the end of the injection nozzle 28 is deflected by an angle of θ5 with the central axis of the fuel injection valve 5C. A deflected direction of the nozzle hole 32 is determined so that the injection nozzle is deflected on the side of the ignition plug 4 when the fuel injection valve 5C is attached to the engine.

When the conical valve 29 is opened, fuel flows into the axial groove 33 and the radial groove 34 and the fuel to which a swirl is applied is injected from the nozzle hole 32. As the nozzle hole 32 is deflected from the central axis of the fuel injection valve 5, the form of spray is asymmetrical with the central axis of the fuel injection valve 5C.

Figure 18:
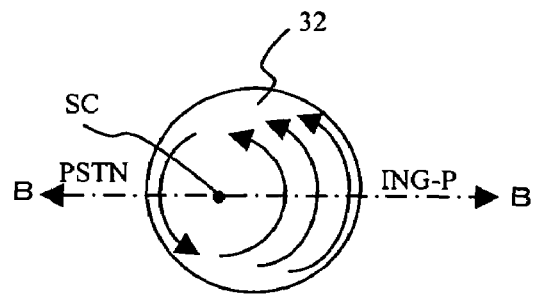
FIG. 18 shows the flow of fuel on a section viewed along line A-A shown in FIG. 17.

FIG. 18 shows the flow of fuel on the section viewed along line A-A of the nozzle hole 32 of the fuel injection valve 5C shown in FIG. 17. As described above, as a swirl is applied to fuel by the swirler 31, the fuel is swirled inside the nozzle hole 32. As the nozzle hole 32 is deflected from the central axis of the fuel injection valve 5, the center SC of the swirl of the fuel in the nozzle hole 32 is displaced on the side of PSTN from the center of the nozzle hole 32.

Figure 19:
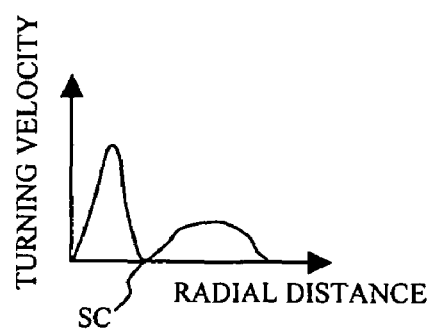
FIG. 19 shows velocity distribution in a direction in which fuel is turned on a section viewed along line B-B shown in FIG. 18.

FIG. 19 shows velocity distribution in a direction in which fuel is swirled on the section viewed along line A-A shown in FIG. 18. As the center SC of the swirl of the fuel in the injection nozzle is displaced from the central axis of the fuel injection valve 5, the velocity in a direction of the swirl on the side of IGN-P of the fuel is slower than the velocity in a direction of the swirl on the side of PSTN of the fuel.

Figure 20:
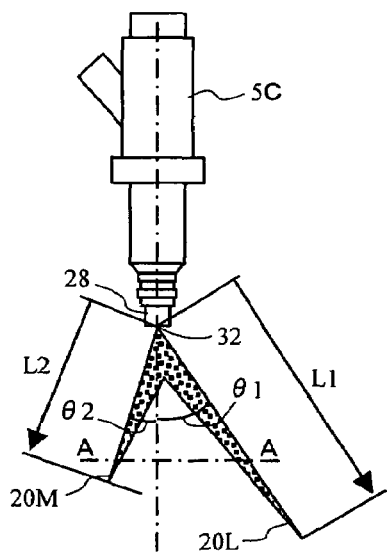
FIG. 20 is a side view showing the form of fuel spray injected from the fuel injection valve shown in FIG. 16.
Figure 21:
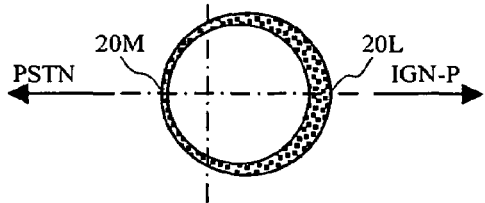
FIG. 21 is a sectional view viewed along line A-A shown in FIG. 20.

FIG. 20 is a side view showing the form of fuel spray injected from the fuel injection valve 5C and FIG. 21 is a sectional view along a line A-A shown in FIG. 20. As the nozzle hole 32 is deflected from the central axis of the fuel injection valve 5, a direction in which fuel is injected is equal to a direction in which the nozzle hole 32 is deflected. The penetration L1 of the deflected side (the side of IGN-P) is longer, compared with the penetration L2 of the reverse side (the side of PSTN). The reason is as follows.

As the velocity in the direction of the swirl on the side of IGN-P is slower than the velocity in the direction of the swirl on the side of PSTN as shown in FIG. 19, centrifugal force applied to the fuel in the nozzle hole 32 is weaker on the side of IGN-P, as compared with that on the side of PSTN. Therefore, the thickness of a droplet film formed immediately under the nozzle hole 32 is thicker on the side of IGN-P and is thinner on the side of PSTN. Hereby, the atomization of the droplet film on the side of IGN-P is poorer, as compared with the atomization on the side of PSTN and particle size on the side of IGN-P is larger, as compared with that on the side of PSTN. Therefore, as for spray injected from the fuel injection valve 5C, the lead spray 20L with longer penetration is generated on the side of IGN-P and the main spray 20M with shorter penetration is generated on the side of PSTN.

The various configurations of the fuel injection valve in the embodiment of the invention have been described above, however, it is desirable that in the fuel injection valve 5 (5A, 5B, 5C) in the embodiment of the invention, secondary injection is possibly prevented from being caused by a bounce of a valve element. That is, the valve element (for example, the conical valve) in the fuel injection valve is opened for predetermined time according to an injection signal from the ECU 6 and fuel is injected, however, immediately after the predetermined time of injection elapses and the valve element in the fuel injection valve is closed, the valve element is bounced and excess fuel may be injected (secondarily injected). As the particle size of fuel injected in secondary injection is generally large, the force of penetration is strong, besides, as the vaporization is poor, the fuel adheres to the crown face of the piston, and soot (smoke) and HC are caused.

Then, as disclosed in JP-A No. 3840/2001 for example, it is desirable to inhibit bouncing of the valve element by forming a damper between the nozzle and the plunger of the fuel injection valve and to prevent secondary injection from being caused.

Next, warming up operation immediately after the spark ignition engine is started in this embodiment will be described.

First, the whole flow of control over warming up operation will be described.

Figure 22:
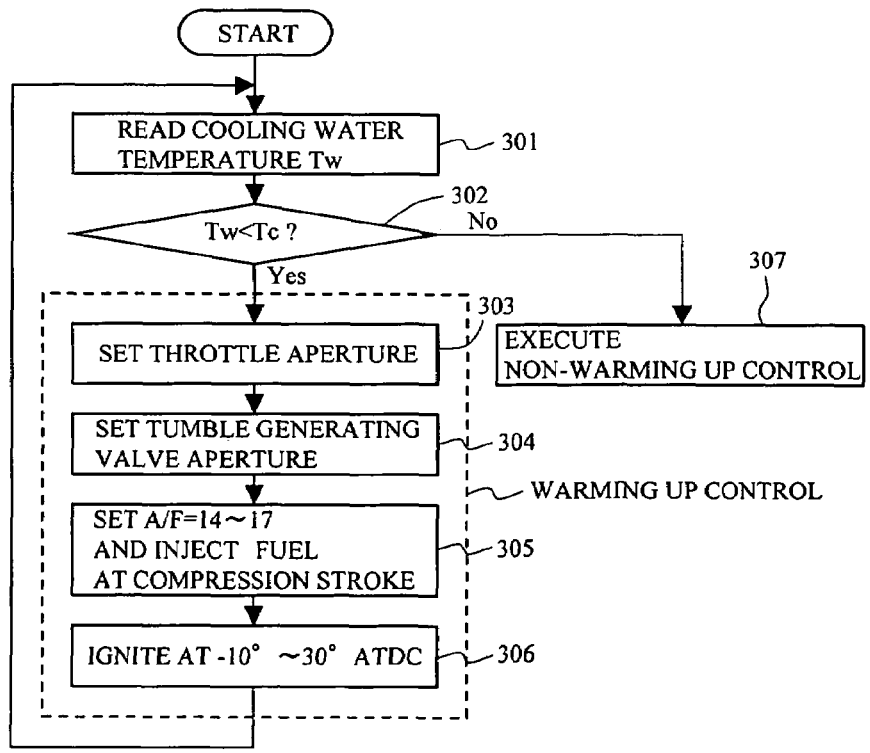
FIG. 22 is a flowchart showing fuel control immediately after the engine is started in the first embodiment.

FIG. 22 is a flowchart showing control over combustion immediately after the spark ignition engine in this embodiment is started. When the engine 1A is started by a starter not shown, the temperature of cooling water 2 for cooling the engine is sensed by a coolant temperature sensor 8 shown in FIG. 1 and a cooling water temperature signal 9 is input to the ECU 6 (301). the ECU 6 compares the temperature Tw of the cooling water 2 of the engine sensed by the coolant temperature sensor 8 and preset reference temperature Tc (302) and in the case where the temperature Tw of the cooling water is lower than the reference temperature Tc, control described later over the warming up of the engine is made. In the case where the temperature Tw of the cooling water is higher than the reference temperature Tc, non-warming up control is made (307). The non-warming up control 307 denotes operation control in which the injection timing and the ignition timing of fuel and an aperture of the tumble generating valve are set so that for example, the fuel economy efficiency of the engine is the highest. The non-warming up control 307 also denotes operation control in which air-fuel ratio is set to the theoretical air-fuel ratio (A/F=14.7) so that for example, the efficiency of purifying HC, CO and NOx in a three-way catalytic converter is the highest. The non-warming up control 307 also denotes operation control in which air-fuel ratio is set so that it is slightly rich (A/F=11 to 12) to prevent knocking when torque required by the engine is high for example.

In the case where the temperature Tw of the cooling water is lower than the reference temperature Tc and control over warming up is selected, an opening signal is sent from the ECU 6 to a throttle valve not shown and an aperture of the throttle valve is set to an angle specified from the ECU (303). The aperture of the throttle valve at this time is set as an aperture where air quantity required to keep the output and the number of revolutions (the output of the engine is 200 to 250 kPa for example under mean effective pressure and the number of revolutions of the engine is 1000 to 2000 rpm for example) of the engine required for warming up can be filled in the combustion chamber 25 in a state in which air-fuel ratio in the combustion chamber 25 is set to 14 to 17 and ignition timing is set to −10 to 30° ATDC. The air quantity at this time is approximately 50% for example at volumetric efficiency. Next, a tumble generating valve aperture signal 35 is sent from the ECU 6 to the motor for driving the tumble generating valve 21 and the tumble generating valve 12 is set to a predetermined aperture (304). An angle of the tumble generating valve is determined beforehand in a preliminary test as a position in which in warming up, the fluctuation of engine speed is smaller than predetermined fluctuation of engine speed. For example, an aperture of the tumble generating valve 12 is fully closed as shown in FIG. 1. That is, the lower part of the section of the intake passage 15 is completely closed by the tumble generating valve 12. Further, in the second half of a compression stroke, a fuel injection signal 11 is sent from the ECU 6 to the fuel injection valve 5 so that air-fuel ratio in the combustion chamber 25 is 14 to 17 and fuel is injected from the fuel injection valve 5 toward the combustion chamber 25 (305). Timing at which the injection of fuel from the fuel injection valve 5 is started is between 80° and 50° CA before a compression top dead center for example. A period in which fuel is injected from the fuel injection valve 5 is 1.5 to 2.5 msec for example. The pressure of fuel is 3 to 11 MPa for example. Next to the injection of fuel, an ignition signal 10 is sent from the ECU 6 to the ignition plug 4 and the fuel is ignited by the ignition plug 4 in a range of −10 to 30° ATDC (306). It is desirable that time interval between the start of fuel injection and the ignition is 9 msec or longer. Therefore, in the case where the engine speed is 1200 rpm and timing at which the fuel injection starts is 70° CA before the top dead center of compression, it is desirable that ignition timing is −5° ATDC or later.

Next, it is to be described of the spray of fuel and the behavior of air-fuel mixture in the combustion chamber of the spark ignition engine 1A related to this embodiment at the time of warming up operation.

Figure 23:
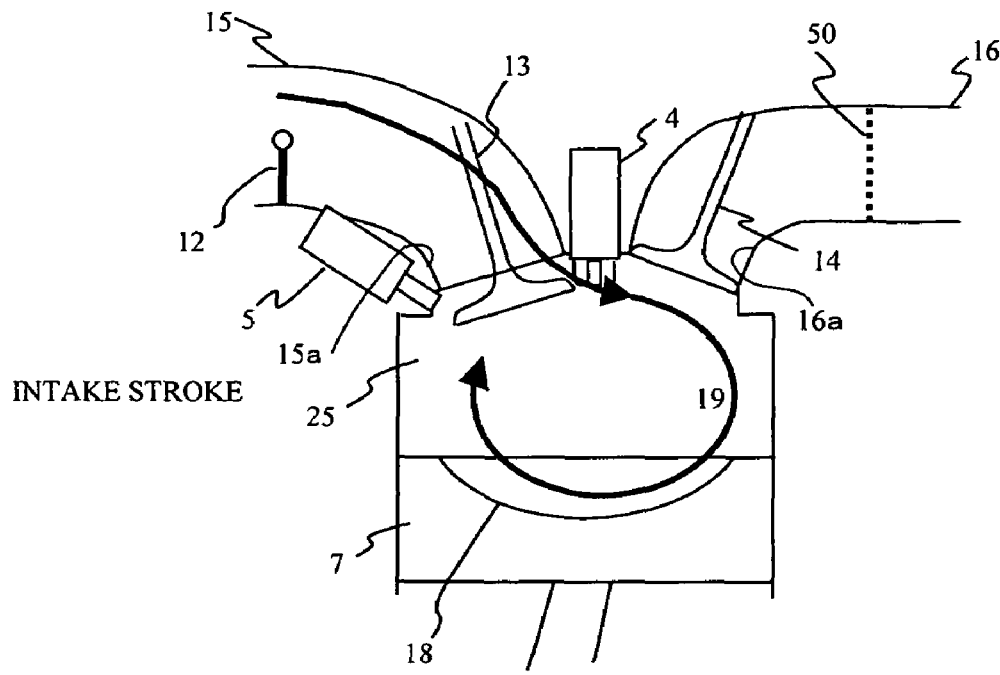
FIG. 23 shows an air flow at an intake stroke in warming up in the first embodiment.

In an intake stroke of the spark ignition engine 1A related to this embodiment at the time of warming up operation, the tumble generating valve 12 in the intake passage 15 is closed as shown in FIG. 23, and then air flows in the upper part of the intake passage 15. As the tumble generating valve 12 in the intake passage 15 is closed, the cross-sectional area of the intake passage 15 is reduced and then the velocity of air flow in the intake passage 15 is faster, as compared with the case of the tumble generating valve 12 being open. Fast flowing air in the upper part of the intake passage 15 flows into the combustion chamber 25 through an opening of the intake valve 13 and generates a forward tumble flow 19 in the combustion chamber 25 as shown in FIG. 23. The strength of the forward tumble flow at this time is 2 to 4 at tumble ratio (the mean angular velocity of tumble/the angular velocity of crank) for example.

At compression stroke following intake stroke, the intake valve 13 is closed and piston 7 is lifted toward the top dead center. As piston 7 is lifted, the capacity in combustion chamber 25 reduces and the shape of combustion chamber 25 is turned flat, however, even in the second half of the compression stroke, the forward tumble flow 19 in the combustion chamber 25 is kept without collapsing on account of the concave groove 18 on the crown face of piston 7.

Figure 24:
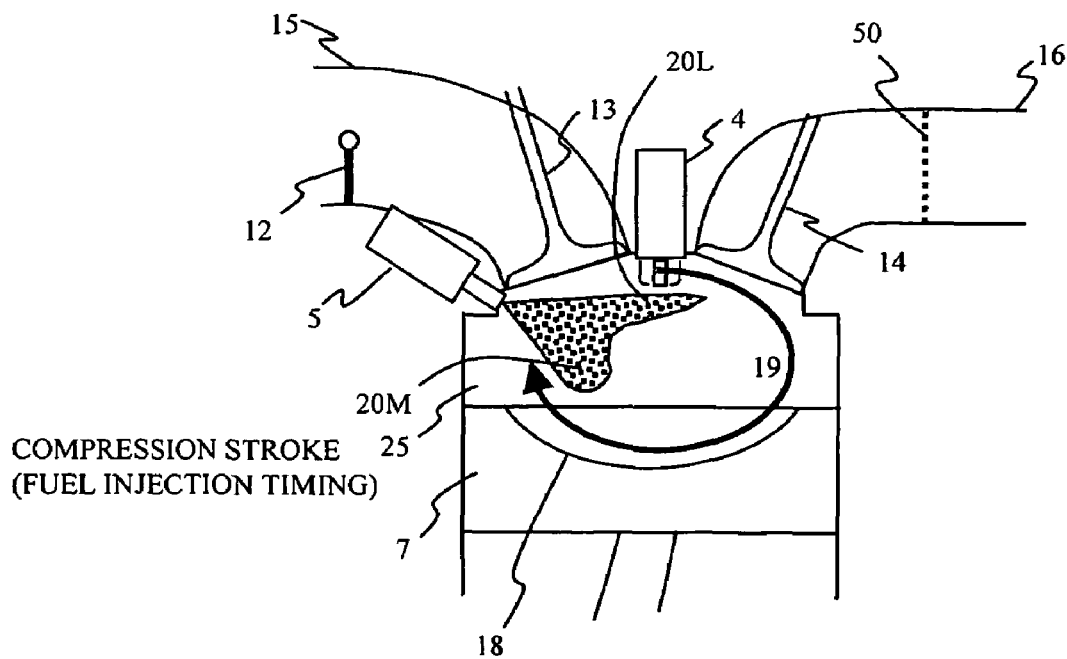
FIG. 24 shows an air flow and the form of fuel spray at a compression stroke (a middle term) in warming up in the first embodiment.

As shown in FIG. 24, in the second half of the compression stroke, the injection signal 11 is sent from the ECU 6 to the fuel injection valve 5 and fuel is injected from the fuel injection valve 5 into the combustion chamber 25. As for the amount of fuel injected at this time, injection period and fuel pressure are regulated so that the mean air-fuel ratio in the combustion chamber 25 is approximately 14 to 17. The timing at which fuel injection starts is, for example, 80 to 50° CA before the compression top dead center, and the injection period is, for example, 1.5 to 2.5 msec. The pressure of fuel is, for example, 3 to 11 MPa.

As shown in FIG. 24, in this embodiment, fuel spray injected from the fuel injection valve 5 includes the lead spray 20L toward the side of the ignition plug 4 and the main spray 20M toward the side of the piston 7 as described above. Besides, as described above, the penetration of the lead spray 20L is longer, as compared with that of the main spray 20M. The traveling direction of the lead spray 20L toward ignition plug 4 is substantially the same as the direction of the forward tumble flow 19 in the combustion chamber 25. The velocity of the lead spray 20L immediately after injection is 60 to 80 m/s for example. In the meantime, the velocity of the forward tumble flow 19 at the same timing is 10 to 20 m/s when the number of revolutions of the engine is 1200 rpm for example. That is, the velocity of the lead spray 20L is greatly faster than the velocity of the forward tumble flow 19. Therefore, air in the upper part of the combustion chamber 25 is accelerated from the intake side toward the exhaust side by the lead spray 20L.

Figure 25:
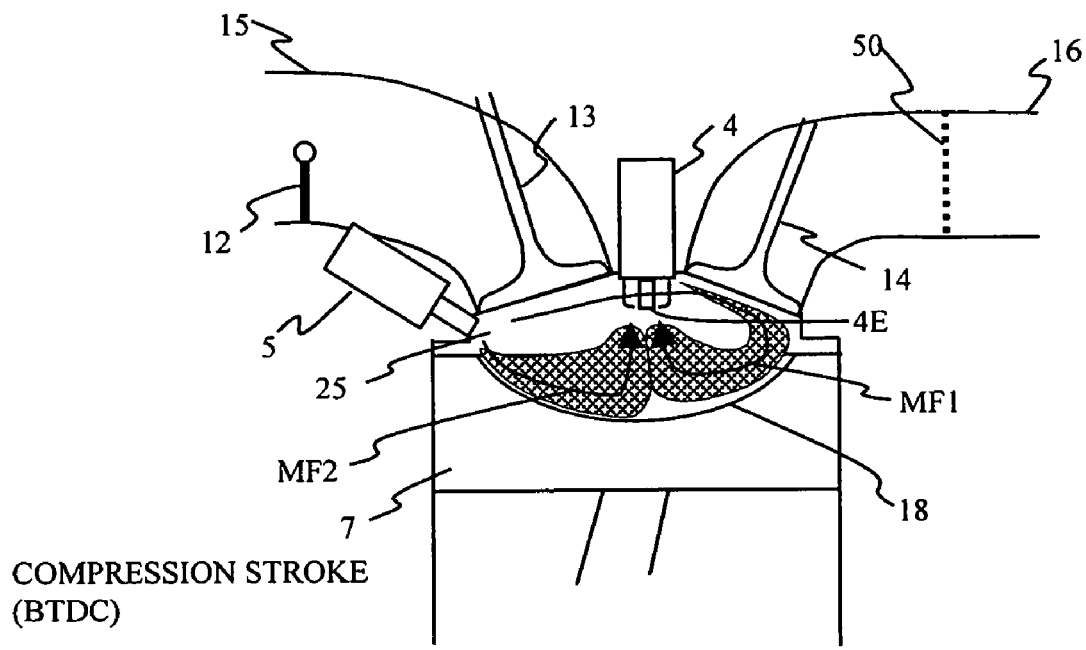
FIG. 25 shows the behavior of air-fuel mixture at the compression stroke (a latter term) in warming up in the first embodiment.

As shown in FIG. 25, air accelerated by the lead spray 20L is turned rich air-fuel mixture by the vaporization of the lead spray 20L, turns back on the wall on the exhaust side of the combustion chamber 25 through the upper part of the combustion chamber 25, and becomes an air-fuel mixture flow MF1 toward the center of the combustion chamber 25 along the surface of the piston 7.

In the meantime, as shown in FIG. 24, a traveling direction of the main spray 20M directed to the piston 7 is opposite to the direction of the forward tumble flow 19 along the concave groove 18 of the crown face of the piston 7. The penetration of the main spray 20M is shorter and weaker, as compared with that of the lead spray 20L. Therefore, the main spray 20M collides with the forward tumble flow 19 along the concave groove 18 of the crown face of the piston 7 so as to lose rapidly mutual momentum. The velocity of the main spray 20M immediately after injection is 40 to 60 m/s for example and is faster, as compared with the velocity of the forward tumble flow 19 which is 10 to 20 m/s. Therefore, as shown in FIG. 25, a direction of an air flow on the surface of the piston 4 is changed by the penetration of the main spray 20M and the main spray becomes an air-fuel mixture flow MF2 toward the center of the combustion chamber 25 from the intake side, forming rich air-fuel mixture by the vaporization of the main spray 20M. The main spray 20M is injected toward the crown face of the piston 7 as described above, however, as the main spray is opposite to the direction of the tumble flow 19 in the combustion chamber 4, the velocity of the main spray 20M is reduced promptly after injection. As large velocity difference is made between the main spray 20M and the tumble flow 19, the main spray 20M is promptly vaporized and a fuel droplet film is hardly generated on the crown face of the piston 7.

As shown in FIG. 25, the air-fuel mixture flow MF1 flowing toward the center of the combustion chamber from the intake side by the penetration of the lead spray and the air-fuel mixture flow MF2 flowing toward the center of the combustion chamber from the intake side by the penetration of the main spray collide in the vicinity of the center of the concave groove 19 of the crown face of the piston 7, that is, under the ignition plug electrode 4E, and rich air-fuel mixture rises from the crown face of the piston 7 toward the ignition plug electrode 4E.

Figure 26:
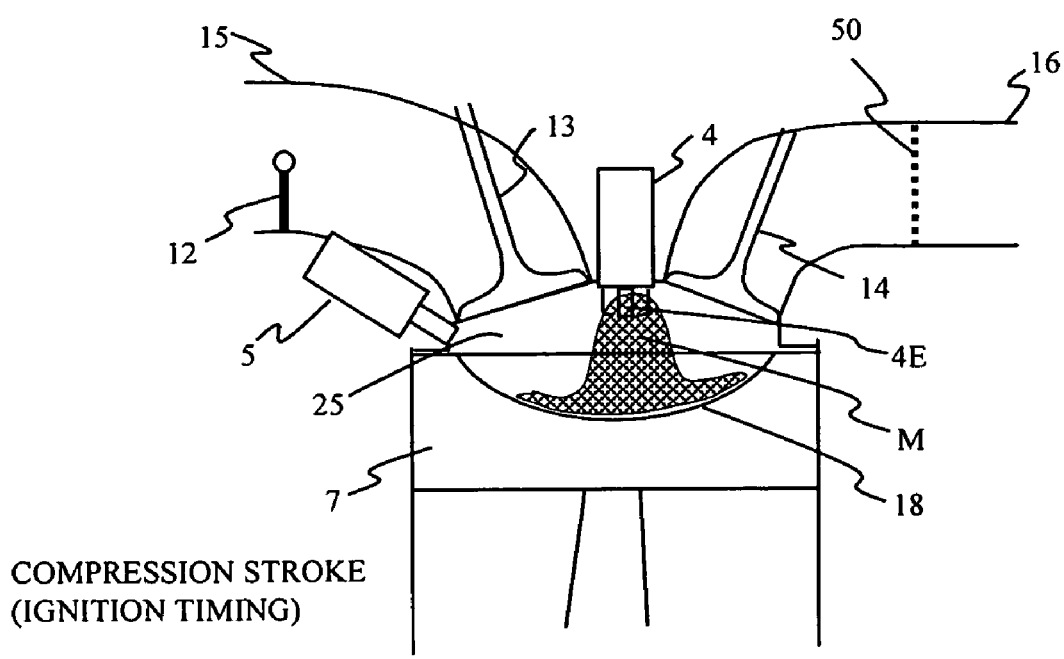
FIG. 26 shows the behavior of air-fuel mixture at ignition timing in warming up in the first embodiment.

As shown in FIG. 26, in the vicinity of the compression top dead center, the motion of the air-fuel mixture is slowed by the loss of momentum by the collision of the air-fuel mixture flows MF1 and MF2 from opposite directions and by the rise of gas pressure in the combustion chamber 25 due to the rise of the piston 7. Therefore, rich air-fuel mixture M remains around the ignition plug electrode 4E.

Air-fuel ratio (A/F) around the ignition plug electrode 4E at this time is 5 to 10 for example showing very over-rich air-fuel mixture.

Next, in the vicinity of the top dead center or after the top dead center, air-fuel mixture in the combustion chamber 25 is ignited by the ignition plug 4 according to an ignition signal from the ECU 6.

Figure 27:
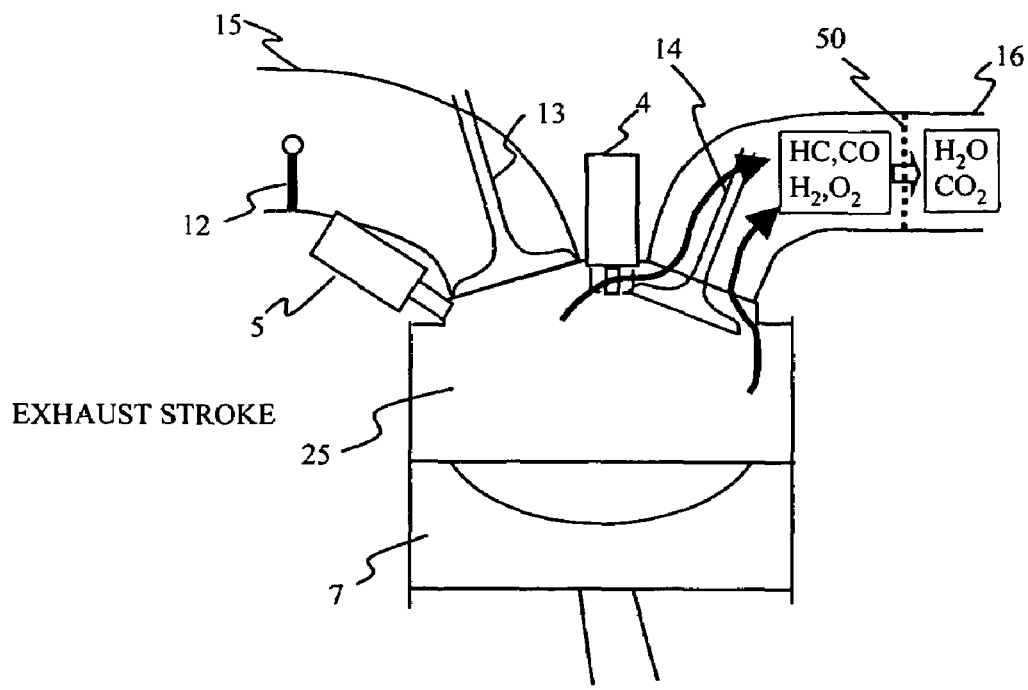
FIG. 27 shows an exhaust flow at an exhaust stroke in warming up in the first embodiment.

As shown in FIG. 26, in the combustion chamber 25, at ignition timing, over-rich air-fuel mixture is generated around the ignition plug electrode 4E and in the periphery of the combustion chamber 25 apart from the ignition plug electrode 4E, relatively rarefied air-fuel mixture is generated. Therefore, the air-fuel mixture is not completely combusted in the combustion chamber 25 at the expansion stroke and at an exhaust stroke and as shown in FIG. 27, much HC, CO, $H_2$ and $O_2$ are exhausted into the exhaust passage 16 at the exhaust stroke.

Figure 28:
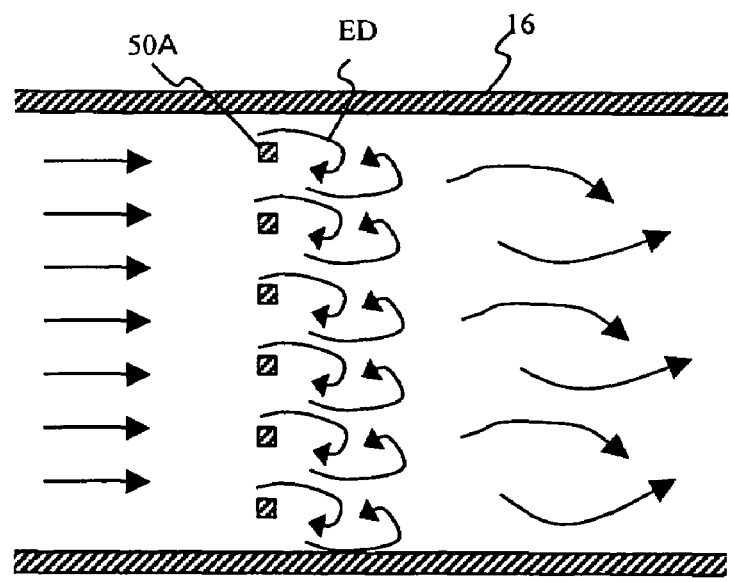
FIG. 28 is an explanatory drawing for explaining the turbulence of an exhaust flow in the exhaust passage in which the turbulence generating tool is provided.

As the turbulence generating tool 50A is provided in the exhaust passage 16, an exhaust flow is separated immediately after the turbulence generating tool 50A as shown in FIG. 28 and a turbulence vortex (a Karman vortex) ED is generated. In the turbulence vortex, the mixture of HC, CO, $H_2$ and $O_2$ exhausted into the exhaust passage 16 is accelerated and HC is rapidly oxidized. As a result, exhaust temperature in the exhaust passage 16 rises and the concentration of HC is decreased. Hereby, the concentration of HC in the warming up of the engine is decreased and the temperature of the catalytic converter provided in a lower part of the exhaust passage 16 can be promptly raised up to temperature at which exhaust purification efficiency is high by high-temperature exhaust.

In this embodiment, fuel is injected in the second half of the compression stroke so that air-fuel ratio is 14 to 17. A conventional type has a problem that the quantity of soot (smoke) increases when fuel is injected so that mixture ratio is close to the theoretical mixture ratio in the second half of the compression stroke. However, in this embodiment, as spray including the lead spray the penetration of which is strong and the main spray, the penetration of which is weak, is used and further, the forward tumble flow is generated in the combustion chamber, a fuel droplet film by the collision of the main spray toward the side of the piston with the crown face of the piston is hardly formed as described above. Besides, the lead spray is directed to the direction of ignition plug, is vaporized without adhesion to the wall, and is mixed with air in the combustion chamber. As described above, in this embodiment, as the adhesion to the wall of fuel is seldom caused and therefore, a fuel droplet film is hardly formed, soot can be prevented from being caused even if fuel is injected so that air-fuel ratio is close to the theoretical air-fuel ratio in the second half of the compression stroke. Hereby, much HC, CO, $O_2$, $H_2$ are exhausted into the exhaust passage, and the decrease of HC by the oxidization of HC in the exhaust passage, the rise of exhaust temperature and the activation of a catalyst are efficiently executed together with combustion acceleration effect by the turbulence generating tool 50A.

Next, another combustion control method in this embodiment will be described, however, prior to it, the object of warming up control of the spark ignition engine is to be described.

In the above-mentioned combustion control in warming up operation, an aperture of the tumble generating valve 12 for generating the forward tumble flow in the combustion chamber 25 is set to a predetermined aperture by the ECU 6. The aperture of the tumble generating valve 12 is predetermined by preliminary test and others so that the fluctuation of engine speed and the fluctuation of torque of the engine during warming up operation are predetermined values or less.

In warming up, as the combustion of HC in the exhaust passage 16 is increased, exhaust temperature is raised and the generation of soot is inhibited, it is desirable to delay ignition timing to the extent possible. However, when the ignition timing is excessively delayed, it is generally known that combustion is deteriorated and the fluctuation of engine speed and the fluctuation of torque are increased. Then, to delay ignition timing to the extent possible, it is necessary that fixed concentration of air-fuel mixture is securely concentrated around the ignition plug at ignition timing and even if ignition is delayed, the air-fuel mixture can be securely ignited by the ignition plug.

Figure 29:
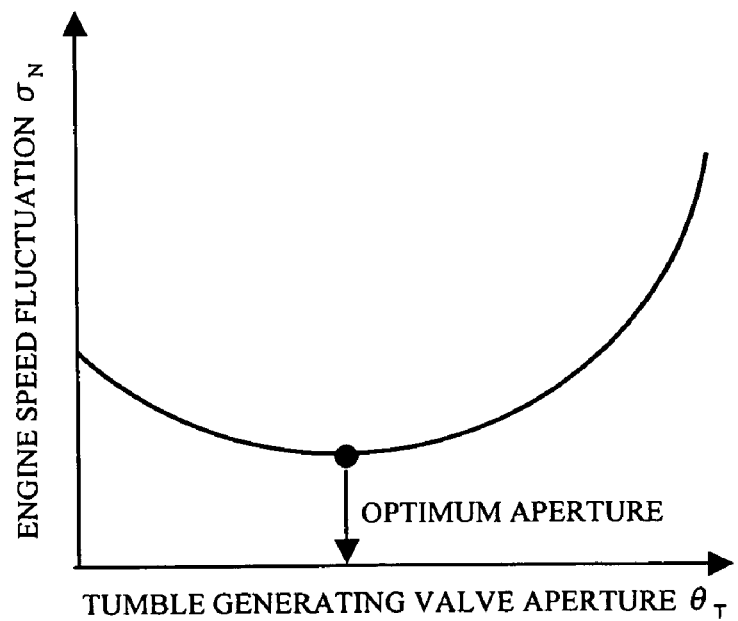
FIG. 29 shows relation between an aperture of a tumble generating valve in warming up in the first embodiment and engine speed fluctuation.

FIG. 29 shows an example showing relation between an aperture $\theta_t$ of the tumble generating valve 12 and the fluctuation $\sigma_N$ of engine speed in warming up in the spark ignition engine 1A.

Figure 30:
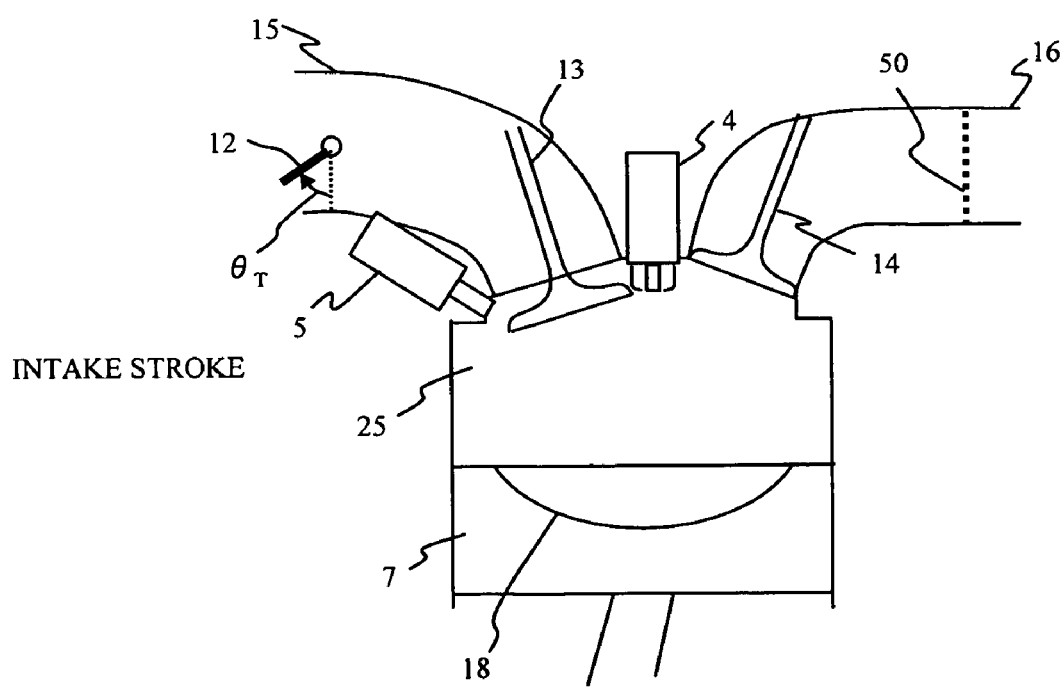
FIG. 30 is an explanatory drawing for explaining the definition of an aperture of the tumble generating valve.

In this case, the aperture $\theta_T$ of the tumble generating valve 12 is defined as an aperture when a fully closed state of the tumble generating valve 12 is adopted as a criterion (0°) as shown in FIG. 30.

The fluctuation $\sigma_N$ of engine speed is defined as standard deviation from mean engine speed Ne as shown in the following expressions 1 and 2. "n" in the expressions 1 and 2 denotes a sampling number of engine speed. As described above, engine speed Ne is detected by the ECU 6 based upon a turning angle signal 38 from the turning angle sensor 37 and a reference position signal 41 from the reference position sensor 40 respectively input to the ECU 6. Engine speed Ne is detected every time a crankshaft is once rotated (every one cycle) for 100 cycles (n=100) for example and the fluctuation $\sigma_N$ of engine speed is calculated based upon the data of the numbers of revolutions for 100 cycles using the expressions 1 and 2 by the ECU 6.

$$\sigma_N = \sqrt{\frac{\sum_{i=1}^{n}(Ne_i - \overline{Ne})^2}{n}} \qquad \text{Expression 1}$$

$$\overline{Ne} = \frac{\sum_{i=1}^{n} Ne_i}{n} \qquad \text{Expression 2}$$

As shown in FIG. 29, the aperture $\theta_T$ of the tumble generating valve and the fluctuation $\sigma_N$ of engine speed are correlated, the fluctuation $\sigma_N$ of engine speed can be minimized by setting the aperture $\theta_T$ of the tumble generating valve to an optimum value, and an ignition lag can be increased.

Figure 31:
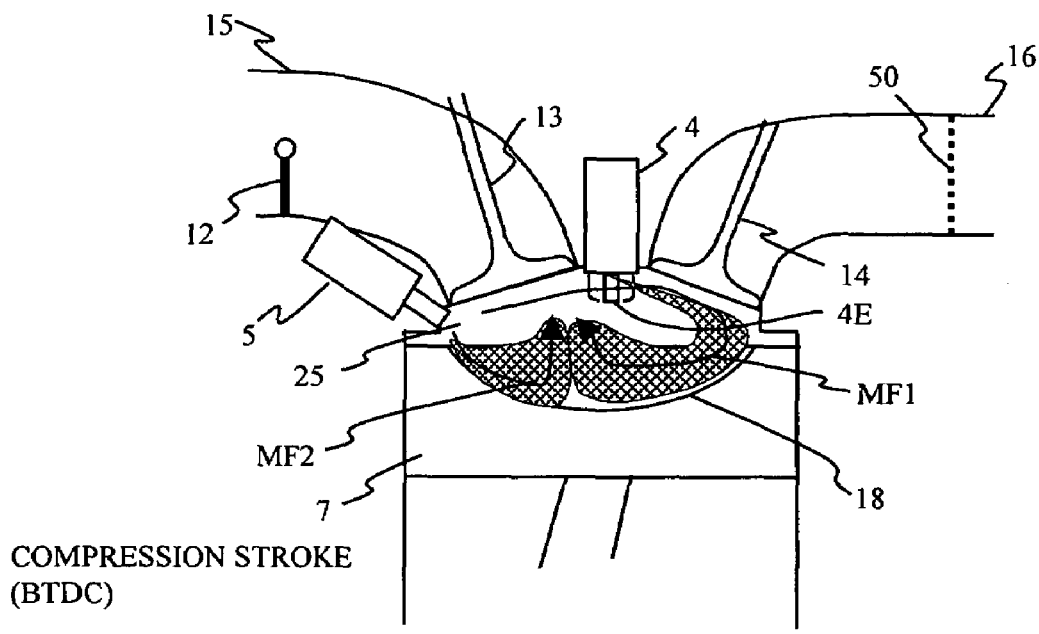
FIG. 31 shows the behavior of air-fuel mixture at the latter term of the compression stroke in the combustion chamber in the case where an aperture of the tumble generating valve is excessively small and a forward tumble flow in the combustion chamber is too strong in warming up.
Figure 32:
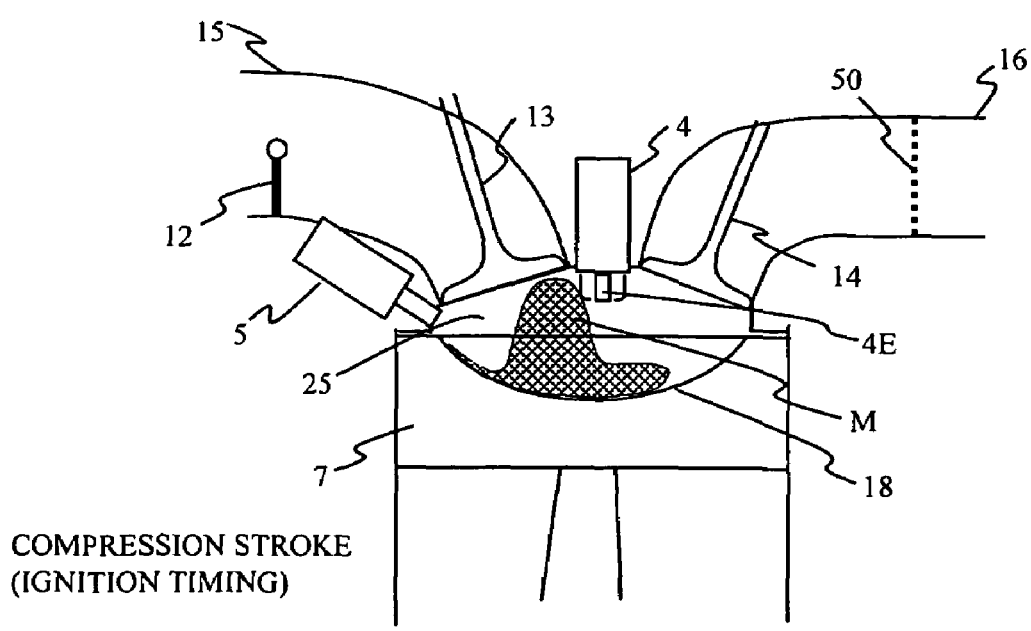
FIG. 32 shows the behavior of air-fuel mixture at ignition timing in the combustion chamber in the case where an aperture of the tumble generating valve is excessively small and the forward tumble flow in the combustion chamber is too strong in warming up.

FIGS. 31 and 32 show the behavior of air-fuel mixture in the combustion chamber 25 in the case where the aperture $\theta_T$ of the tumble generating valve is excessively small and the forward tumble flow in the combustion chamber 25 is too strong at the time of warming up operation.

When the forward tumble flow in the combustion chamber 25 is stronger than an optimum tumble flow, the direction of the lead spray injected and the direction of the forward tumble flow are equal and the air-fuel mixture flow MF1, flowing from the exhaust side toward the center of the combustion chamber owing to the penetration of the lead spray, becomes stronger. The main spray and the forward tumble flow are opposite and the air-fuel mixture flow MF2, flowing from the intake side toward the center of the combustion chamber owing to the penetration of the main spray, becomes weaker. As a result, as shown in FIG. 31, a position in which the air-fuel mixture flow MF1 and the air-fuel mixture flow MF2 collide is transferred to the intake side from a position of the ignition plug electrode 4E. As a result, as shown in FIG. 32, rich air-fuel mixture M remains on the intake side of the ignition plug electrode 4E, the concentration of air-fuel mixture in the vicinity of the ignition plug electrode 4E decreases, ignitability to the air-fuel mixture is deteriorated, and the fluctuation of engine speed and the fluctuation of torque increase.

Figure 33:
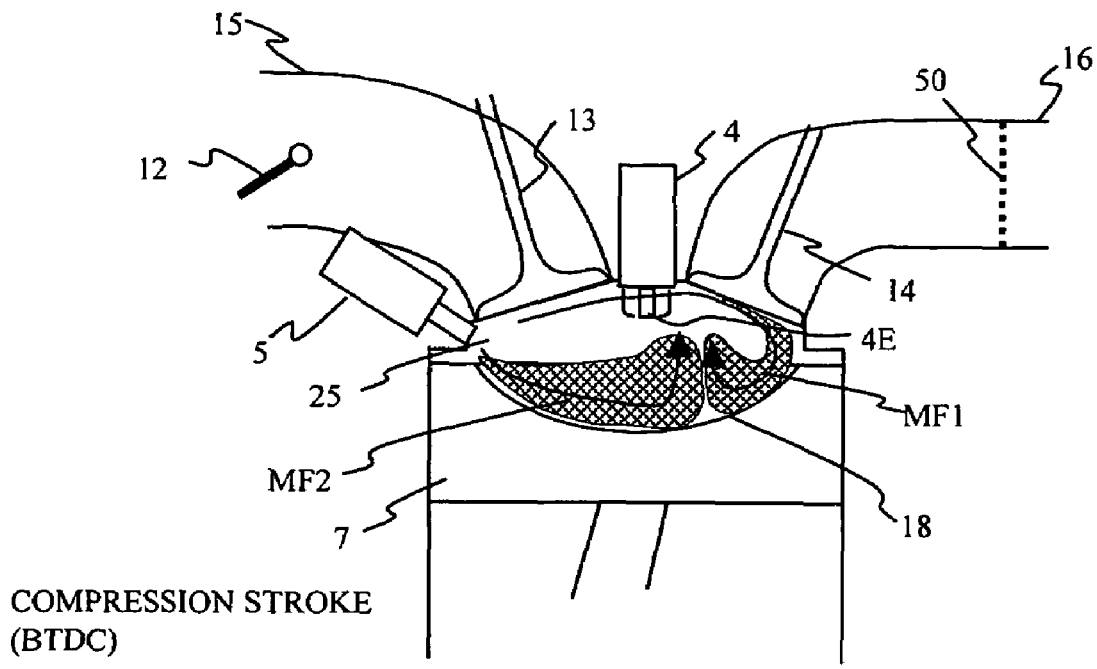
FIG. 33 shows the behavior of air-fuel mixture at the latter term of the compression stroke in the combustion chamber in the case where an aperture of the tumble generating valve is excessively large and the forward tumble flow in the combustion chamber is too weak in warming up.
Figure 34:
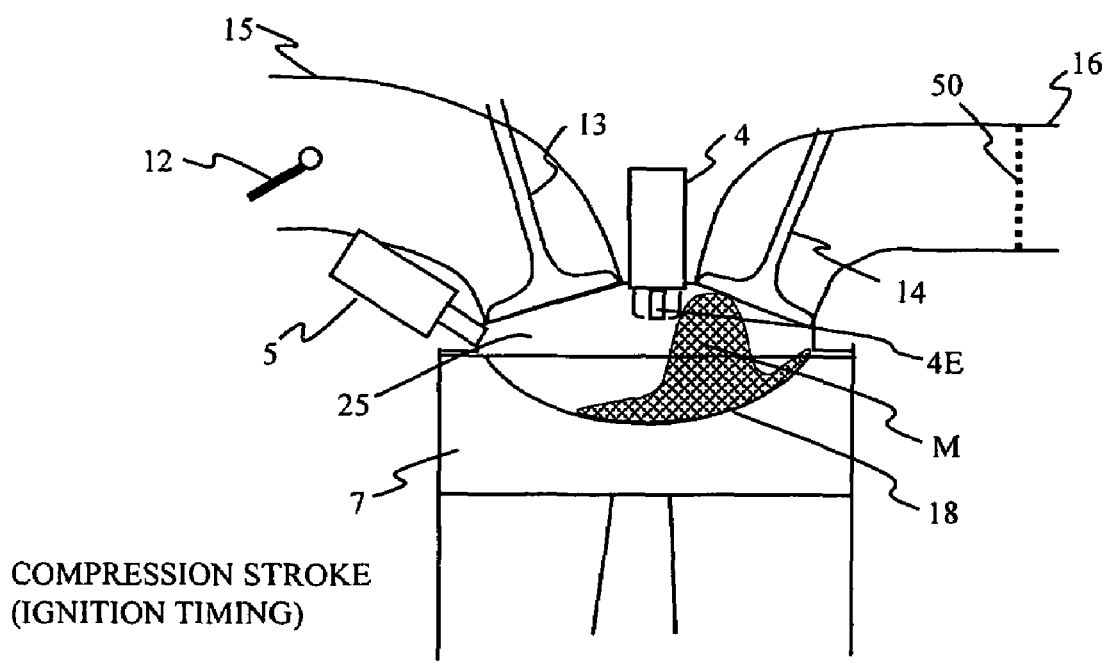
FIG. 34 shows the behavior of air-fuel mixture at ignition timing in the combustion chamber in the case where an aperture of the tumble generating valve is excessively large and the forward tumble flow in the combustion chamber is too weak in warming up.

FIGS. 33 and 34 show the behavior of air-fuel mixture in the combustion chamber 25 in the case where the aperture $\theta_T$ of the tumble generating valve is excessively large and the forward tumble flow in the combustion chamber 25 is too weak at the time of warming up operation.

When the forward tumble flow in the combustion chamber 25 is weaker than an optimum forward tumble flow, the direction of the lead spray injected and the direction of the forward tumble flow are equal, and the air-fuel mixture flow MF1, flowing from the exhaust side toward the center of the combustion chamber owing to the penetration of the lead spray, becomes weaker. In the meantime, the main spray and the forward tumble flow are opposite and the air-fuel mixture flow MF2 flowing from the intake side toward the center of the combustion chamber by the penetration of the main spray becomes stronger. As a result, as shown in FIG. 33, a position in which the air-fuel mixture flow MF1 and the air-fuel mixture flow MF2 collide is transferred to the exhaust side from the position of the ignition plug electrode 4E. As a result, as shown in FIG. 34, rich air-fuel mixture M remains on the exhaust side of the ignition plug electrode 4E, the concentration of air-fuel mixture in the vicinity of the ignition plug electrode 4E decreases, ignitability to the air-fuel mixture by the ignition plug is deteriorated, and the fluctuation of engine speed and the fluctuation of torque increase.

That is, in warming up, to inhibit the fluctuation of engine speed and the fluctuation of torque and further delay ignition timing, the aperture $\theta_T$ of the tumble generating valve 12 is required to be set to an optimum aperture.

Then, in warming up, optimum control over ignition timing and the tumble generation valve is executed.

Figure 35:
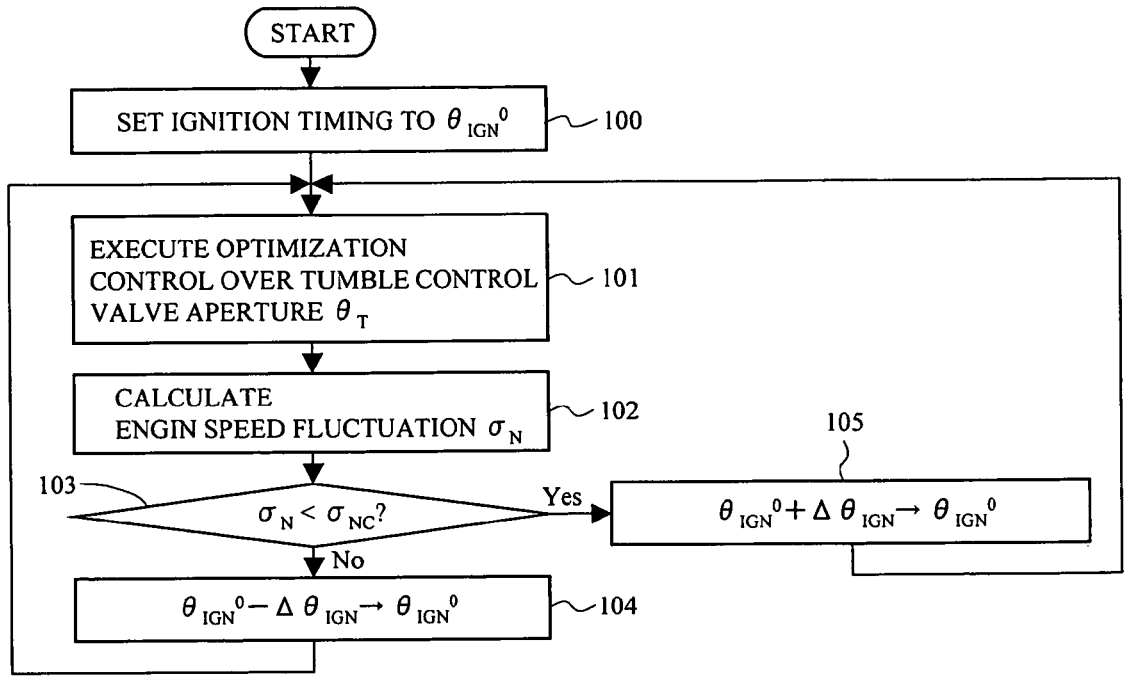
FIG. 35 is a flowchart showing a procedure of ignition timing control in warming up in the first embodiment.

FIG. 35 is a flowchart showing a procedure of optimum control over ignition timing in warming up.

First, the ECU sets ignition timing to $\theta_{IGN}^0$ (100). $\theta_{IGN}^0$ is an initial value of ignition timing and ignition timing at which the fluctuation of engine speed and the fluctuation of torque are small and combustion in the engine can be securely lasted is set in a preliminary test and others. "$\theta_{IGN}^0$" is 10° CA before the top dead center at the compression stroke for example.

Next, optimization control described later over the aperture $\theta_T$ of the tumble generating valve is executed and the aperture $\theta_T$ of the tumble generating valve is set so that the fluctuation of engine speed and the fluctuation of torque are the smallest (101).

Next, the fluctuation $\sigma_N$ of engine speed is calculated using the expressions 1 and 2 (102).

The calculated fluctuation $\sigma_N$ of engine speed is compared with a preset threshold $\sigma_{NC}$ of the fluctuation of engine speed (103). The threshold $\sigma_{NC}$ of the fluctuation of engine speed is set as an upper limit value of the fluctuation of engine speed which a driver of the vehicle can allow in warming up for example.

As a lag of ignition timing is allowed in the case where the fluctuation $\sigma_N$ of engine speed is smaller than the threshold $\sigma_{NC}$ of the fluctuation of engine speed, new ignition timing is delayed by $\Delta\theta_{IGN}$ from the current ignition timing $\theta_{IGN}^0$ and is replaced with $\theta_{IGN}^0$ (105). "$\Delta\theta_{IGN}$" denotes a positive ignition timing changed angle and is 1° CA for example. The process starting from 101 is repeated using newly set ignition timing $\theta_{IGN}^0$.

In the meantime, in the step 103, as combustion is unstable in the case where the fluctuation $\sigma_N$ of engine speed is larger than the threshold $\sigma_{NC}$ of the fluctuation of engine speed, new ignition timing is advanced by $\Delta\theta_{IGN}$ from the current ignition timing $\theta_{IGN}^0$ to stabilize combustion and is replaced with $\theta_{IGN}^0$ (104). The process starting from 101 is repeated using the newly set ignition timing $\theta_{IGN}^0$.

Next, referring to FIG. 36, the optimization control over the tumble generating valve aperture $\theta_T$ shown in FIG. 35 will be described.

Figure 36:
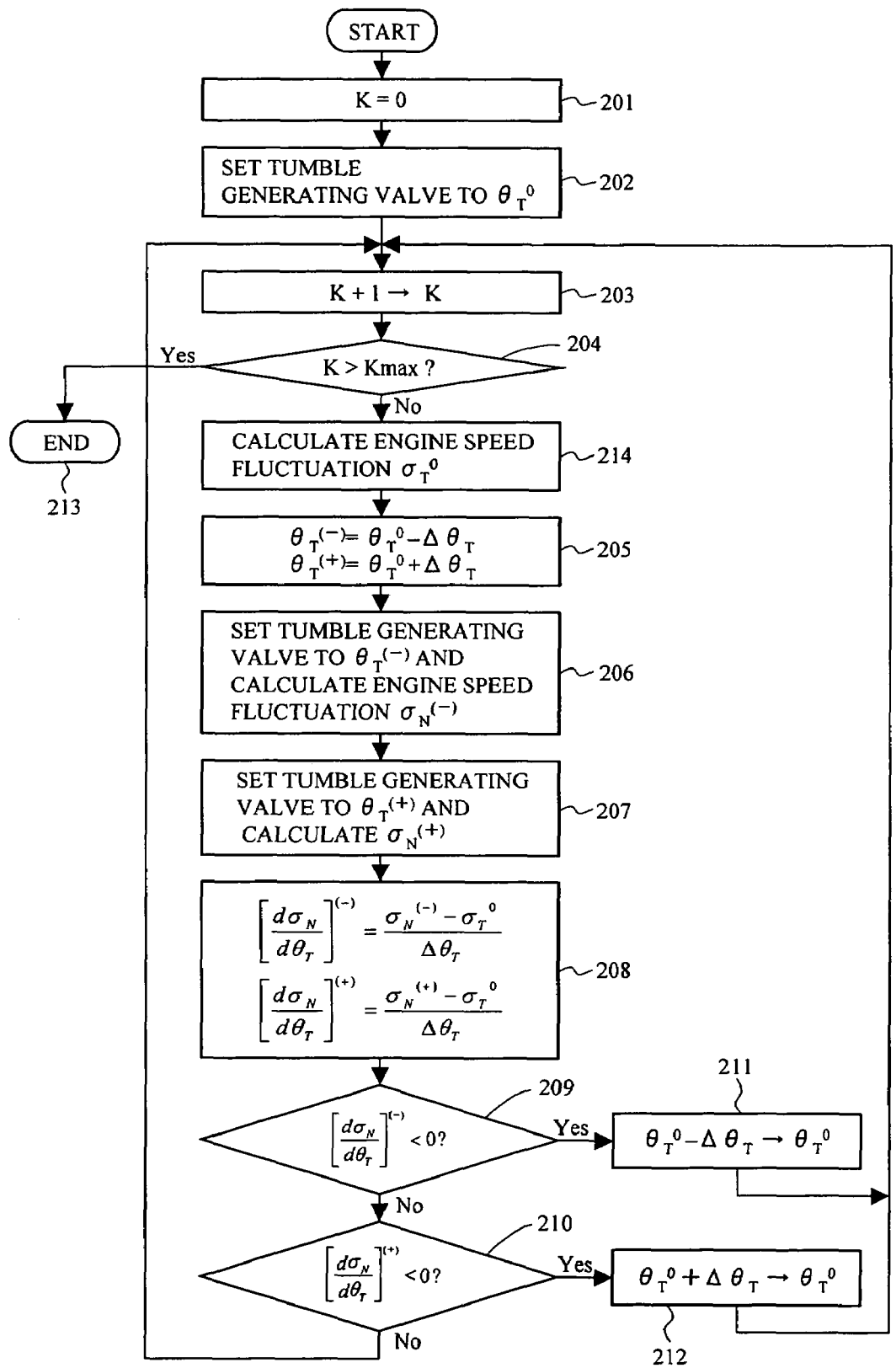
FIG. 36 is a flowchart showing the optimization control of an aperture of the tumble generating valve in warming up in the first embodiment.

FIG. 36 is a flowchart showing the optimization control over the tumble generating valve aperture $\theta_T$.

In the optimization control over the tumble generating valve aperture $\theta_T$, first, a value of a counter K is initialized (201) and next, an aperture of the tumble generating valve is set to an initial value $\theta_T{}^0$ (202). The initial aperture $\theta_T{}^0$ of the tumble generating valve is set between a completely closed state and a completely opened state and is 45° for example.

Next, the value of the counter K is incremented by 1 (203) and the value of the counter K is compared with a predetermined threshold Kmax (204). "Kmax" is a frequency specifying how many times the reset of the tumble generating valve aperture $\theta_T$ is repeated and is 100 or a larger number for example.

When a value of the counter K is larger than the threshold Kmax, the optimization control over the tumble generating valve aperture $\theta_T$ is ended (213).

In the meantime, when a value of the counter K is smaller than the threshold Kmax, the fluctuation $\sigma_T{}^0$ of engine speed at the current tumble generating valve aperture $\theta_T{}^0$ is calculated using the expressions 1 and 2 (214).

Next, an aperture $\theta_T{}^{(-)}$ at which the tumble generating valve is closed by $\Delta\theta_T$ from the current aperture and an aperture $\theta_T{}^{(+)}$ at which the tumble generating valve is opened by $\Delta\theta_T$ from the current aperture are calculated (205). In this case, $\Delta\theta_T$ means a preset aperture changed angle of the tumble generating valve and is 1° for example.

Next, the aperture of the tumble generating valve is set to $\theta_T$ and the fluctuation $\sigma_N{}^{(-)}$ of engine speed at that time is calculated using the expressions 1 and 2 (206).

Next, the aperture of the tumble generating valve is set to $\theta_T{}^{(+)}$ and the fluctuation $\sigma_N{}^{(+)}$ of engine speed at that time is calculated using the expressions 1 and 2 (207).

Next, a gradient value of the fluctuation of engine speed for the tumble generating valve aperture is calculated using the following expressions 3 and 4 (208). In this case, $[d\sigma_N/d\theta_T]^{(-)}$ denotes a gradient value of the fluctuation of engine speed for the tumble generating valve aperture in the case where the tumble generating valve is closed by $\Delta\theta_T$. Besides, $[d\sigma_N/d\theta_T]^{(+)}$ denotes a gradient value of the fluctuation of engine speed for the tumble generating valve aperture in the case where the tumble generating valve is opened by $\Delta\theta_T$.

$$\left[\frac{d\sigma_N}{d\theta_T}\right]^{(-)} = \frac{\sigma_N^{(-)} - \sigma_T^0}{\Delta\theta_T} \quad \text{Expression 3}$$

$$\left[\frac{d\sigma_N}{d\theta_T}\right]^{(+)} = \frac{\sigma_N^{(+)} - \sigma_T^0}{\Delta\theta_T} \quad \text{Expression 4}$$

In a step 209, as the fluctuation of engine speed decreases when the tumble generating valve is closed in the case where $[d\sigma_N/d\theta_T]^{(-)}$ is negative, the tumble generating valve is closed by $\Delta\theta_T$ from the aperture $\theta_T{}^0$, the aperture is set as new $\theta_T{}^0$ (211), and the process starting from the step 203 is repeated.

In the step 209, in the case where $[d\sigma_N/d\theta_T]^{(-)}$ is positive, a step 210 is executed.

In the step 210, as the fluctuation of engine speed decreases when the tumble generating valve is opened in the case where $[d\sigma_N/d\theta_T]^{(+)}$ is negative, the tumble generating valve is opened by $\Delta\theta_T$ from the aperture $\theta_T{}^0$, the aperture is set as new $\theta_T{}^0$ (212), and the process starting from the step 203 is repeated.

In the step 210, in the case where $[d\sigma_N/d\theta_T]^{(+)}$ is positive, an aperture of the tumble generating valve is unchanged and the process starting from the step 203 is repeated.

In the step 204, when a value of the counter K exceeds Kmax, the optimization control over the tumble generating valve aperture $\theta_T$ is ended and control is returned to the step 102 shown in FIG. 35.

According to the combustion control in warming up shown in FIGS. 35 and 36, ignition timing can be delayed further by optimally controlling an aperture of the tumble generating valve so that the fluctuation of engine speed is the smallest. Hereby, exhaust temperature is raised, and the effect of the reduction of HC by the combustion of HC in the exhaust passage, the effect of the rise of exhaust temperature and the effect of promptly activating a catalyst can be more enhanced together with the acceleration of the mixture of HC, $O_2$, CO, $H_2$ in the exhaust passage 16 by the turbulence generating tool 50A.

Similar effect to the optimization control over the tumble generating valve aperture can be also acquired by optimization control over fuel pressure. That is, as described above referring to FIGS. 31 to 34, as relation between the penetration of spray and the strength of a tumble flow has only to be suitably regulated so as to delay ignition timing in warming up, ignition timing can be delayed even if the penetration of spray is regulated by fuel pressure.

Figure 37:
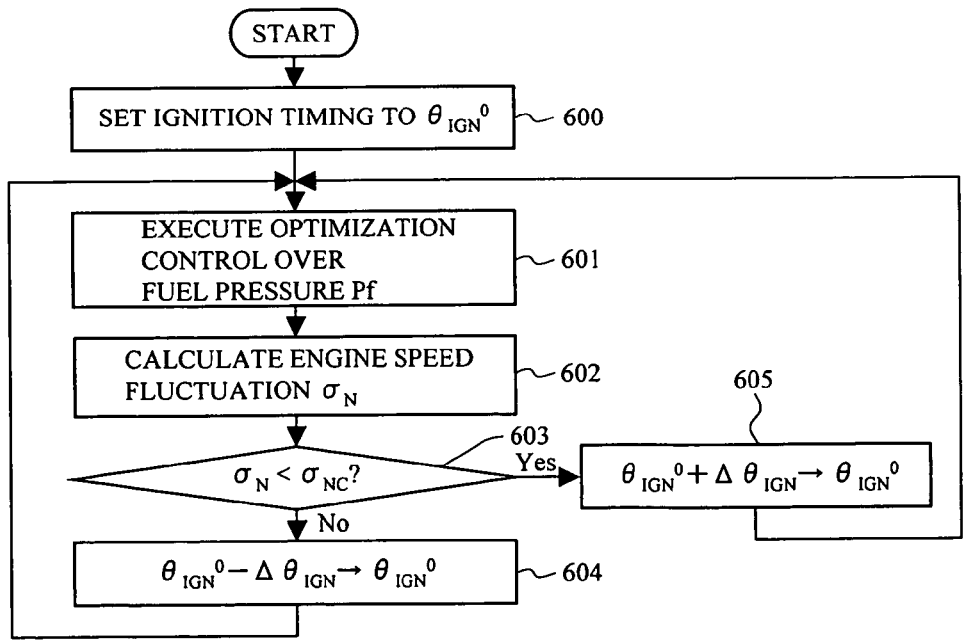
FIG. 37 is a flowchart showing another procedure of ignition timing control in warming up in the first embodiment.
Figure 38:
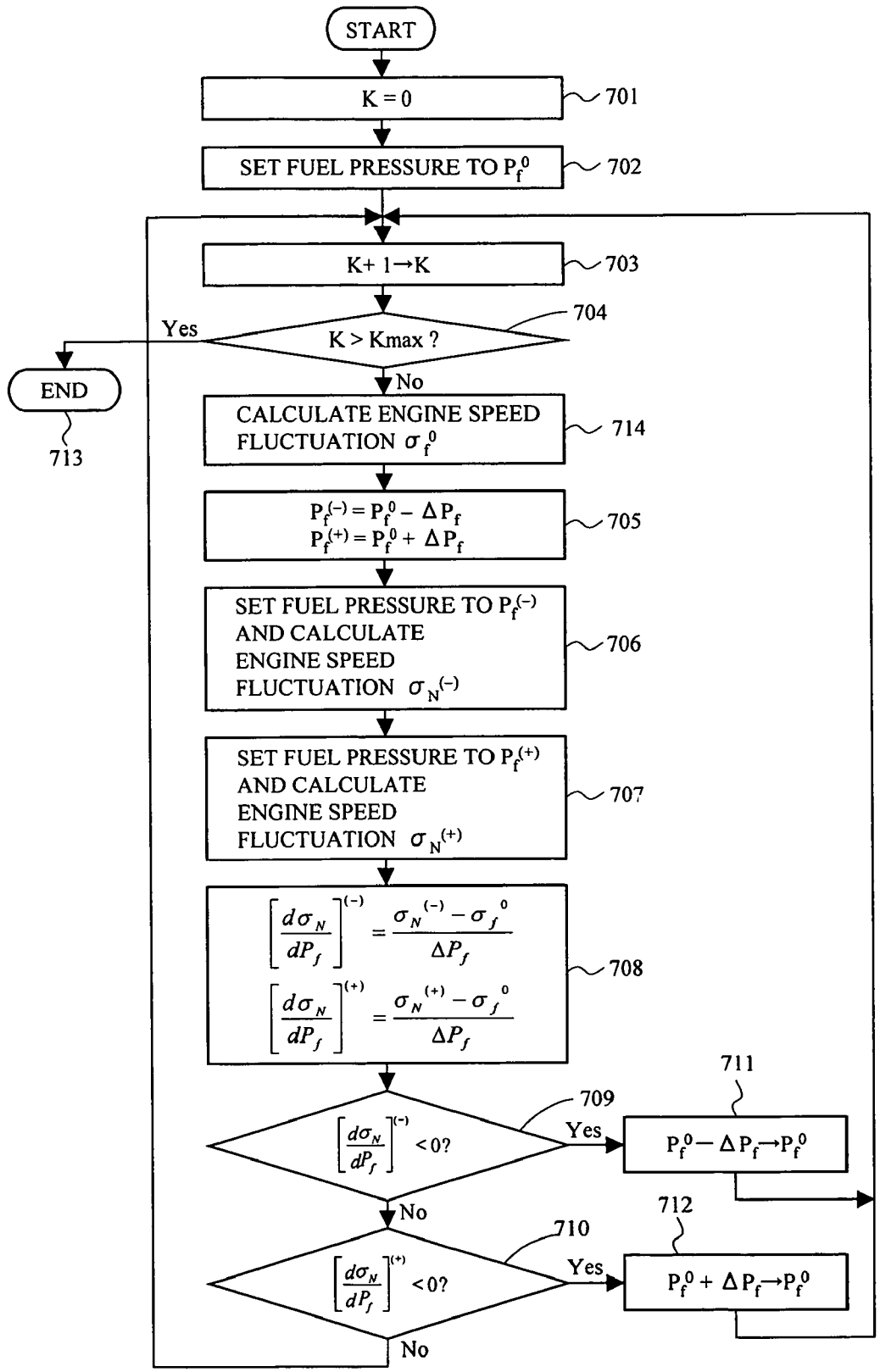
FIG. 38 is a flowchart showing the optimization control of fuel pressure in warming up in the first embodiment.

Then, as shown in FIGS. 37 and 38, optimization control over ignition timing and fuel pressure is executed.

In a flowchart shown in FIG. 37, the ECU sets ignition timing to $\theta_{IGN}{}^0$ (600). "$\theta_{IGN}{}^0$" is an initial value of ignition timing and ignition timing at which the fluctuation of engine speed and the fluctuation of torque are small and combustion in the engine can be securely sustained is set in a preliminary text and others. "$\theta_{IGN}{}^0$" is 10° CA before the compression top dead center for example.

Next, optimization control over fuel pressure $P_f$ described later is executed and the fuel pressure $P_f$ is set so that the fluctuation of engine speed and the fluctuation of torque are the smallest (601).

Next, the fluctuation $\sigma_N$ of engine speed is calculated using the expressions 1 and 2 (602). The calculated fluctuation $\sigma_N$ of engine speed is compared with the preset threshold $\sigma_{NC}$ of the fluctuation of engine speed (603). The threshold $\sigma_{NC}$ of the fluctuation of engine speed is set as an upper limit value of the fluctuation of engine speed which the driver of the vehicle can allow in warming up for example.

As a lag of ignition timing is allowed in the case where the fluctuation $\sigma_N$ of engine speed is smaller than the threshold $\sigma_{NC}$ of the fluctuation of engine speed, new ignition timing is delayed by $\Delta\theta_{IGN}$ from the current ignition timing $\theta_{IGN}{}^0$ and is replaced with $\theta_{IGN}{}^0$ (605). "$\Delta\theta_{IGN}$" denotes a positive ignition timing changed angle and is 1° CA for example. The process starting from 601 is repeated using the newly set ignition timing $\theta_{IGN}{}^0$.

In the meantime, as combustion is unstable in the case where the fluctuation $\sigma_N$ of engine speed is larger than the threshold $\sigma_{NC}$ of the fluctuation of engine speed in the step 603, new ignition timing is advanced by $\Delta\theta_{IGN}$ from the current ignition timing $\theta_{IGN}{}^0$ so as to stabilize combustion and is replaced with $\theta_{IGN}{}^0$ (604). The process starting from 601 is repeated using the newly set ignition timing $\theta_{IGN}{}^0$.

Next, referring to FIG. 38, the optimization control over fuel pressure $P_f$ shown in FIG. 37 will be described. In the optimization control over fuel pressure $p_f$ shown in FIG. 38, first, a value of the counter K is initialized (701) and next, fuel pressure is set to an initial value $p_f{}^0$ (702). The initial value $p_f^0$ of fuel pressure is set between the minimum fuel pressure and the maximum fuel pressure and is 5 MPa for example.

Next, a value of the counter K is incremented by 1 (703) and the value of the counter K is compared with a predetermined threshold Kmax (704). "Kmax" denotes a frequency specifying how many times a reset of fuel pressure $P_f$ is repeated and is 100 or a larger number for example.

When a value of the counter K is larger than the threshold Kmax, the optimization control over fuel pressure $P_f$ is ended (713).

In the meantime, when a value of the counter K is smaller than the threshold Kmax, the fluctuation $\sigma_T^0$ of engine speed at the current fuel pressure $P_f^0$ is calculated using the expressions 1 and 2 (714).

Next, fuel pressure $P_f^{(-)}$ acquired by reducing fuel pressure by $\Delta P_f$ from the current fuel pressure and fuel pressure $P_f^{(+)}$ acquired by increasing fuel pressure by $\Delta P_f$ from the current fuel pressure are calculated (705). In this case, $\Delta P_f$ denotes preset fuel pressure variation and is 0.2 MPa for example.

Next, fuel pressure is set to $P_f^{(-)}$ and the fluctuation $\sigma_N^{(-)}$ of engine speed at that time is calculated using the expressions 1 and 2 (706).

Next, fuel pressure is set to $P_f^{(+)}$ and the fluctuation $\sigma N^{(+)}$ of engine speed at that time is calculated using the expressions 1 and 2 (707).

Next, a gradient value for fuel pressure of the fluctuation of engine speed is calculated using the expressions 3 and 4 (708). $[d\sigma_N/dP_f]^{(-)}$ denotes a gradient value for fuel pressure of the fluctuation of engine speed in the case where fuel pressure is reduced by $\Delta P_f$. $[d\sigma_N/dP_f]^{(+)}$ denotes a gradient value for fuel pressure of the fluctuation of engine speed in the case where fuel pressure is increased by $\Delta P_f$.

In a step 709, as the fluctuation of engine speed is decreased when fuel pressure is reduced in the case where $[d\sigma^N/dP_f]^{(-)}$ is negative, fuel pressure is reduced by $\Delta P_f$ from $P_f$, the fuel pressure is set as new $P_f^0$ (711), and the process starting from 703 is repeated.

In the step 709, in the case where $[d\sigma_N/dP_f]^{(-)}$ is positive, control is transferred to a step 710.

In the step 710, as the fluctuation of engine speed is reduced when fuel pressure is increased in the case where $[d\sigma^N/dP_f]^{(+)}$ is negative, fuel pressure is increased by $\Delta P_f$ from $P_f^0$, the fuel pressure is set as new $P_f^0$ (712), and the process starting from 703 is repeated.

In the step 710, in the case where $[d\sigma_N/dP_f]^{(+)}$ is positive, fuel pressure is unchanged and the process starting from 703 is repeated.

In the step 704, when a value of the counter K exceeds Kmax, the optimization control over fuel pressure $P_f$ is ended and control is transferred to the step 602 shown in FIG. 37.

According to the combustion control in warming up shown in FIGS. 37 and 38, ignition timing can be delayed further by optimally controlling fuel pressure so that the fluctuation of engine speed is the smallest.

Hereby, exhaust temperature is raised, and the effect of the reduction of HC by the combustion of HC in the exhaust passage, the effect of the rise of exhaust temperature and the effect of promptly activating a catalyst can be more enhanced together with the acceleration of the mixture of HC, $O_2$, CO, $H_2$ in the exhaust passage 16 by the turbulence generating tool 50A.

Second Embodiment

Next, a second embodiment of the spark ignition engine according to the invention will be described.

Figure 39:
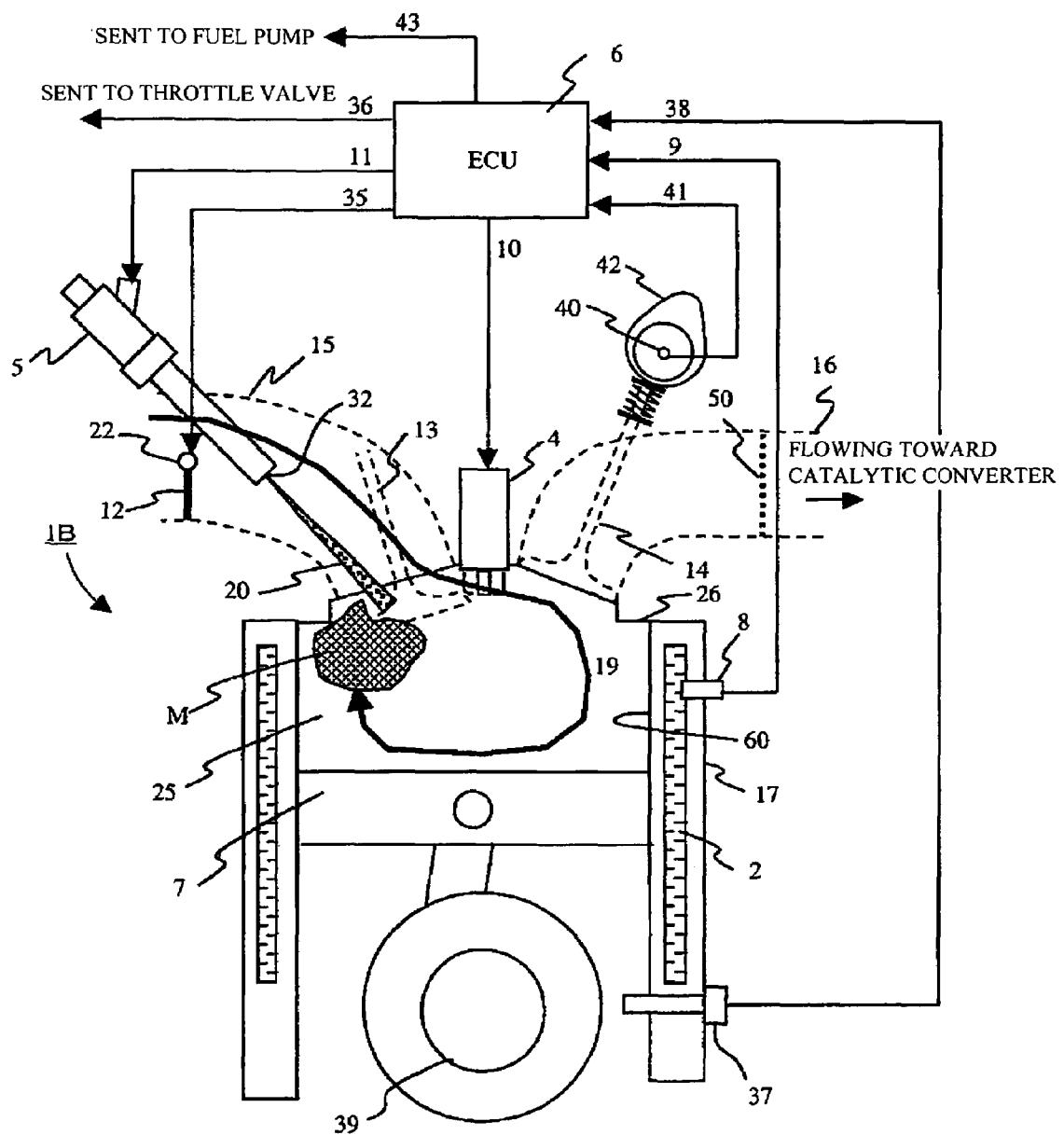
FIG. 39 is a schematic block diagram showing the second embodiment of the spark ignition engine according to the invention.

FIG. 39 shows a spark ignition engine 1B equivalent to the second embodiment. The spark ignition engine 1B equivalent to the second embodiment is an intake port injection-type spark ignition engine and is the most different from the first embodiment (the direct injection type) in this point. In FIG. 39, the same reference numeral is allocated to a part corresponding to each part shown in FIG. 1, the repeated description is omitted, and difference will be selectively described below. A piston 7 is inserted into a cylinder bore 60 so that the piston can be slid and a combustion chamber 25 is formed over the piston 7.

Figure 40:
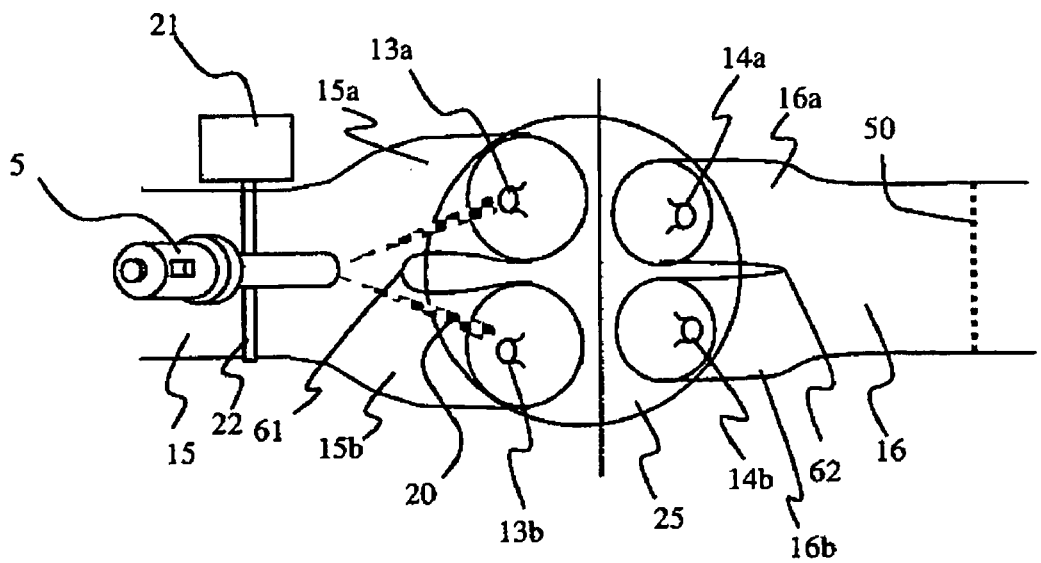
FIG. 40 is a schematic plan showing the configuration of the circumference of a combustion chamber in the engine shown in FIG. 39.

The end (a downstream end) of an intake passage 15 is branched in two by a branching wall 61 as shown in FIG. 40. The intake passage 15 the end of which is branched in two communicates with one side of the combustion chamber 25 and intake valves 13a, 13b are installed in intake ports 15a, 15b forming the ends. Similarly, the end (an upstream end) of an exhaust passage 16 is also branched in two. The exhaust passage 16 communicates with the other side of the combustion chamber 60 and exhaust valves 14a, 14b are installed in exhaust ports 16a, 16b forming the ends.

A catalytic converter not shown is provided to the rear of the exhaust passage 16. The catalytic converter is a three-way catalytic converter, an NOx absorption catalytic converter and an HC absorption catalytic converter for example. These different types of catalytic converters may be also combined. One catalytic converter (a hybrid catalytic converter) may be also provided with functions of these different types of catalytic converters.

A throttle valve not shown is provided to the upstream side of the intake passage 15 and the quantity of air filled in the combustion chamber 25 is controlled depending upon an aperture of the throttle valve. The throttle valve is electrically controlled and the aperture of the throttle valve can be regulated to be an arbitrary aperture according to a throttle valve aperture signal 36 from the ECU 6.

A tumble generating valve 12 for opening and closing a lower half of the intake passage 15 is arranged on the directly upstream side of the intake ports 15a, 15b in the intake passage 15. The tumble generating valve 12 is turned by a driving motor 21 directly coupled to its valve stem 22 and its aperture is controlled by a tumble generating valve aperture signal 35 supplied from the ECU 6 to the driving motor 21. When the tumble generating valve 12 is fully closed (the lower half of the intake passage 15 is completely closed), the strongest forward tumble flow is generated in the combustion chamber 25 and when the tumble generating valve 12 is turned by approximately 90 degrees from the fully closed state (in parallel with the flow of air), a forward tumble flow in the combustion chamber 25 is turned the weakest.

A fuel injection valve 5 for injecting fuel into the intake ports 15a, 15b is attached above the tumble generating valve 12 in the intake passage 15 and an injection nozzle 28 of the fuel injection valve 25 is protruded inside the intake passage 15. The end of the injection nozzle 28, that is, a nozzle hole 32 of the fuel injection valve 5 is located on the downstream side of a turning shaft 22 of the tumble generating valve 12 and on the lower side of the turning shaft. Therefore, the nozzle hole 32 of the fuel injection valve 5 is located on the lower side of a streamline of an air flow generated in an upper half of the intake passage 15 when the tumble generating valve 12 is closed. The fuel injection valve 5 can inject fuel 20 in two directions and the fuel injected from the valve is directed to heads of the intake valves 13*a*, 13*b* for opening and closing the intake ports 15*a*, 15*b*. It is desirable that the fuel injection valve 5 can inject fuel the particle size of which is small so that the injected fuel can be promptly vaporized in the combustion chamber 25 and it is desirable that its mean particle size is approximately 30 μm or less. For such an injection valve, a method of using assist gas and a method of using a multi-hole nozzle are conceivable.

An injected amount and the injection timing of fuel injected from the fuel injection valve 5 are controlled according to an injection signal 11 from the ECU 6.

An ignition plug 4 is provided in an upper part of the combustion chamber 60 is provided and ignites air-fuel mixture.

A turning angle signal 38 from a turning angle sensor 37 that outputs a pulse signal for every fixed crank angle (for example, for every 30° CA) and a reference position signal 41 from a reference position sensor 40 that outputs a pulse signal for every 720° CA) are input to the ECU 6. The ECU 6 detects engine speed Ne and a reference crank position based upon the turning angle signal 38 and the reference position signal 41.

A turbulence generating tool 50 is provided to the exhaust passage 16 (the exhaust manifold) as in the first embodiment. It is desirable that the turbulence generating tool 50 is attached in a position in which the temperature of exhaust exhausted from the combustion chamber 25 is high enough in warming up described later and its position is within approximately 500 mm on the downstream side of the exhaust passage from the most upstream part in the exhaust passage. Exhaust temperature in warming up in the position in which the turbulence generating tool 50 is attached is approximately 600° C. or higher.

A coolant temperature sensor 8 for detecting the temperature of cooling water 2 is attached to a cylinder block 17 and a coolant temperature signal 9 is input from the sensor to the ECU 6.

Figure 41:
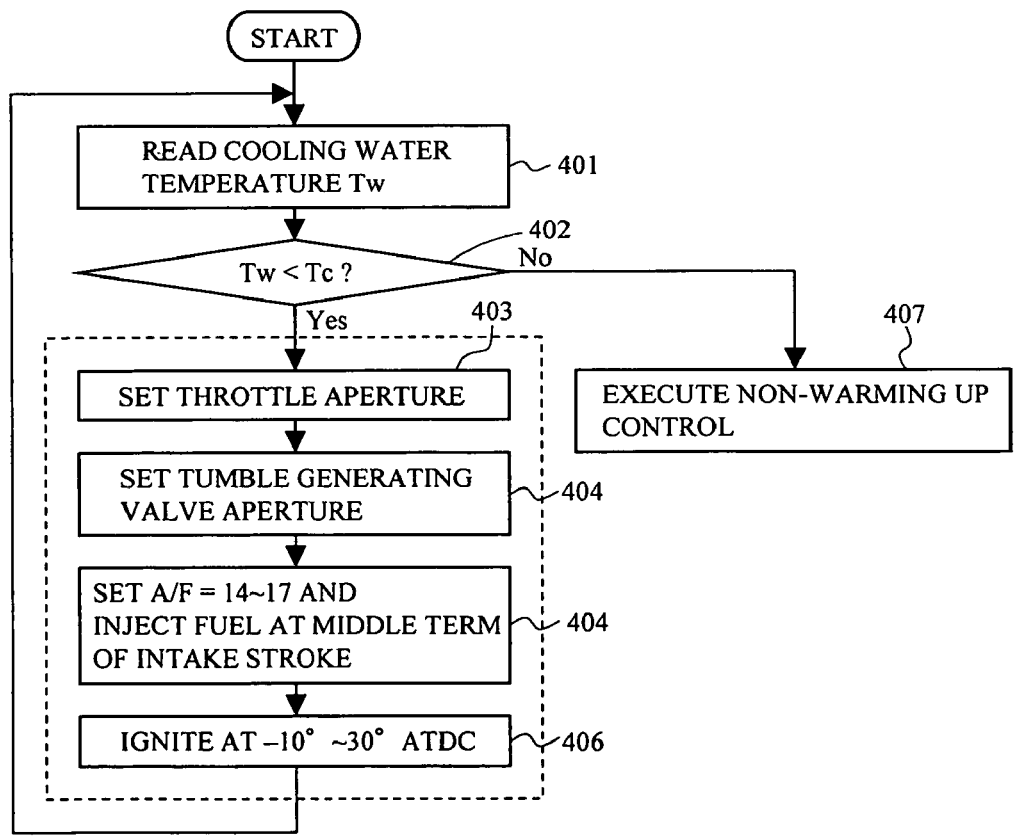
FIG. 41 is a flowchart showing fuel control immediately after the engine in the second embodiment is started.

FIG. 41 is a flowchart showing combustion control executed by the ECU 6 immediately after the engine 1B is started. When the engine 1B is started by a starter not shown, the temperature of cooling water 2 is detected by the coolant temperature sensor 8 and the coolant temperature signal 9 is input to the ECU 6 (401). The ECU 6 compares the temperature of cooling water Tw detected by the coolant temperature sensor 8 and a preset reference temperature Tc (402) and executes warming up control in the case where the temperature of cooling water Tw is lower than the reference temperature Tc. In the case where the temperature of cooling water Tw is higher than the reference temperature Tc, the ECU executes non-warming up control (407). The non-warming up control denotes operation control in which the injection timing of fuel, ignition timing and an aperture of the tumble generating valve are set so that the fuel economy efficiency of the engine is the highest. The non-warming up control also denotes operation control in which air-fuel ratio is set to the theoretical air-fuel ratio (A/F=14.7) so that the purification efficiency of HC, CO and NOx in the three-way catalytic converter is the highest. The non-warming up control also denotes operation control in which when torque required by the engine is high, air-fuel ratio is set so that it is slightly rich (A/F=11 to 12) to prevent knocking.

In the case where the temperature Tw of cooling water is lower than the reference temperature Tc and warming up control is selected, an aperture signal is sent from the ECU 6 to the throttle valve and an aperture of the throttle valve is set to an angle specified by the ECU (403). The aperture of the throttle valve at this time is set as an aperture at which air capacity required to keep the output of the engine and the number of revolutions required for warming up (the output of the engine is 200 to 250 kPa for example under mean effective pressure shown in the drawing and engine speed is 1000 to 2000 rpm for example) can be filled in the combustion chamber 25 in a state in which air-fuel ratio in the combustion chamber 25 is set between 14 to 17 and ignition timing is set between −10 to 30° ATDC. The air capacity at this time is approximately 50% at volumetric efficiency for example.

Next, a tumble generating valve aperture signal 35 is sent from the ECU 6 to a tumble generating valve driving motor 21 and the tumble generating valve 12 is set to a predetermined aperture (404). The aperture of the tumble generating valve is predetermined in a preliminary test and others as an aperture at which in warming up, the fluctuation of engine speed is smaller than a predetermined value. For example, an aperture of the tumble generating valve 12 is fully closed as shown in FIG. 39. That is, a lower half of the intake passage 15 is completely closed by the tumble generating valve 12. Further, a fuel injection signal 11 is sent from the ECU 6 to the fuel injection valve 5 in a middle period of an intake stroke so that air-fuel ratio in the combustion chamber 25 is between 14 to 17 and fuel is injected from the fuel injection valve 5 into the combustion chamber 25 (405). Timing at which the injection of fuel is started from the fuel injection valve 5 is 90° CA after an intake top dead center for example. Next to the injection of fuel, an ignition signal 10 is sent from the ECU 6 to the ignition plug 4 and the fuel is ignited by the ignition plug 4 in a range of −10 to 30° ATDC (406).

Next, the generation of air-fuel mixture in the combustion chamber 25 in this embodiment will be described.

Figure 42:
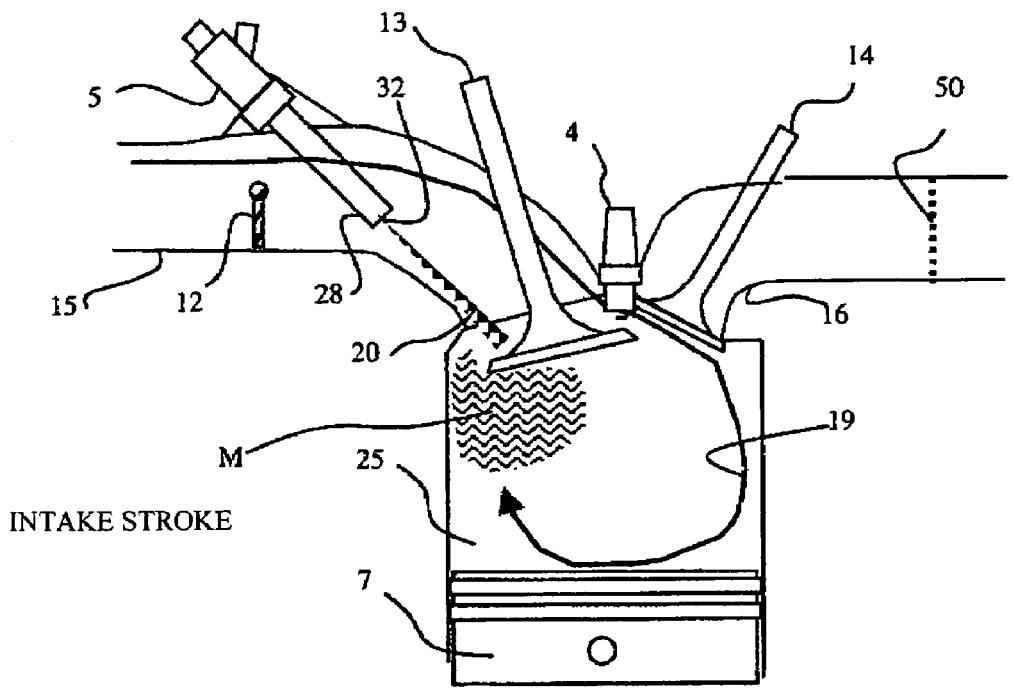
FIG. 42 shows the behavior of air and fuel in the combustion chamber at an intake stroke in the second embodiment.

FIGS. 42 to 45 show a process in warming up in which air-fuel mixture is generated in this embodiment, as shown in FIG. 42, a fast air flow is generated in an upper half of the intake passage 15 by closing the tumble generating valve 12 and by closing a lower section of the intake passage 15, this air flow flows into the combustion chamber 25 via an upper part (on the exhaust side) of the intake valve 13, and a forward tumble flow 19 is generated in the combustion chamber 25. Fuel spray 20 is injected from the fuel injection valve 5 toward the intake side of a head of the intake valve 13 at the intake stroke, however, at this time, as the fuel spray 20 is injected from the nozzle hole 32 arranged under a streamline of the fast air flow generated in the upper half of the intake passage 15 by closing the tumble generating valve 12, such a fast air flow hardly has an effect upon the behavior of the fuel 20. That is, an orbit of the fuel 20 is not curved by the fast air flow and the fuel collides with the intake side of the head of the intake valve 13.

The fuel 20 made to collide with the intake side of the head of the intake valve 13 is atomized on the spot, enters the combustion chamber 25, vaporizing from the circumference on the intake side of the head of the intake valve 13, and generates air-fuel mixture M.

Figure 43:
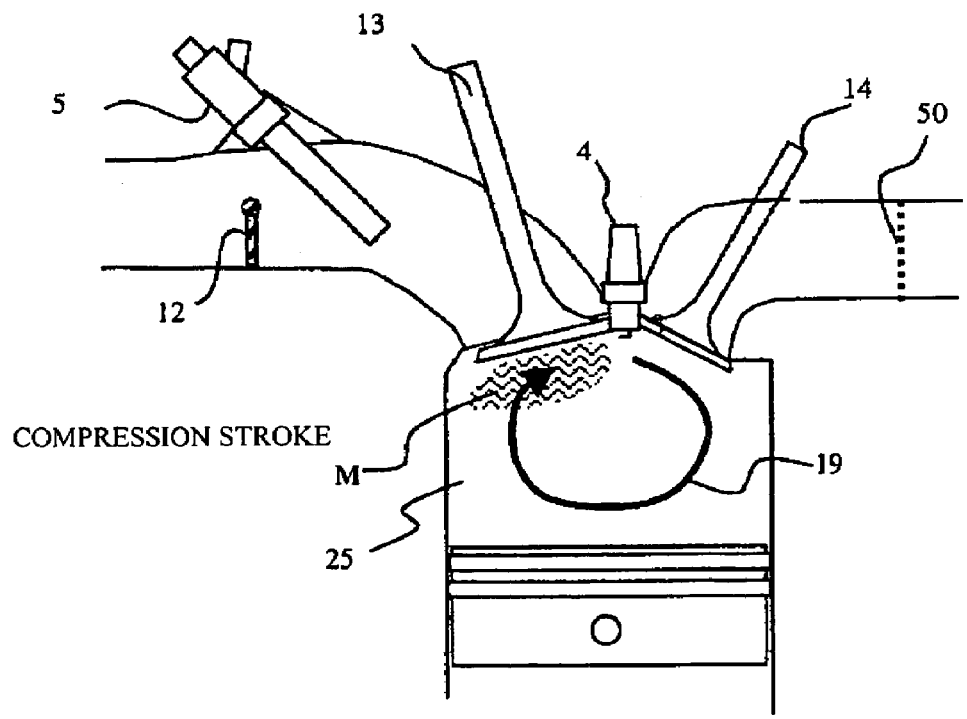
FIG. 43 shows the behavior of air and fuel in the combustion chamber at a compression stroke in the second embodiment.
Figure 44:
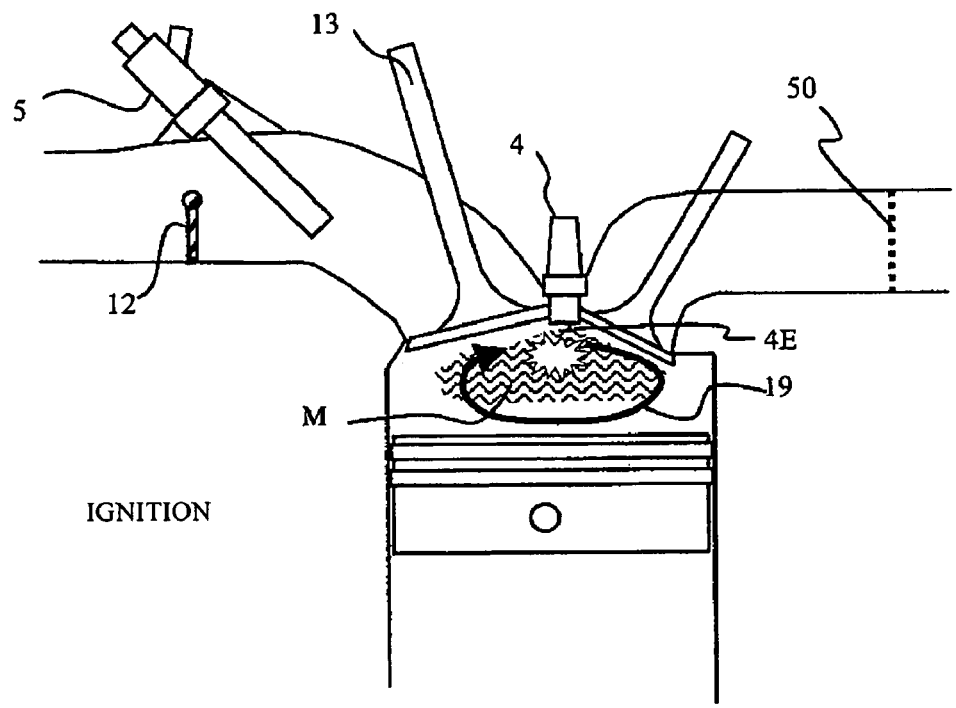
FIG. 44 shows the behavior of air and fuel in the combustion chamber at ignition timing in the second embodiment.

At a compression stroke shown in FIG. 43, the air-fuel mixture M generated under the intake valve 13 is carried into the upper part of the combustion chamber by the forward tumble flow 19 generated in the combustion chamber 25 and is stratified around an ignition plug electrode 4E at ignition timing shown in FIG. 44. Hereby, the air-fuel mixture excellent in ignitability is generated around the ignition plug electrode 4E, is ignited by the ignition plug 4 immediately after a compression stroke top dead center or later, and gas in the combustion chamber is exploded and expanded.

Figure 45:
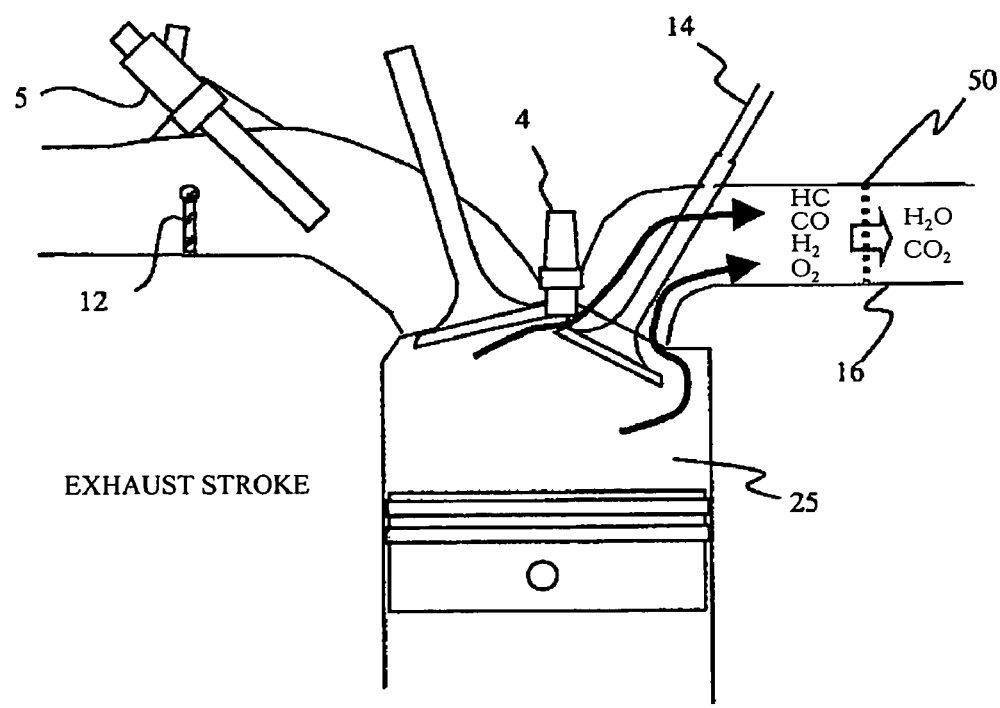
FIG. 45 shows the behavior of exhaust at an exhaust stroke in the second embodiment.

As described above, as the orbit of the fuel spray 20 is not curved by the fast air flow generated by closing the tumble generating valve 12, the adhesion to the wall of the intake passage of the fuel spray 20 can be reduced, the exhaust of HC can be reduced, and the air-fuel mixture M can be securely stratified around the ignition plug electrode 4E. As the injection timing of fuel is included in the middle period of the intake stroke as shown in FIG. 42, the air-fuel mixture M concentrates only around the ignition plug electrode 4E as shown in FIG. 44. Therefore, even if ignition timing is delayed up to −10 to 30° ATDC, the air-fuel mixture is securely ignited and stable combustion is enabled. As the air-fuel mixture is stratified substantially at the theoretical air-fuel ratio, A/F=5 to 10 in a stratified part, the stratified part is very rich, and therefore, HC is not completely oxidized (combusted) in the combustion chamber 25. Therefore, as shown in FIG. 45, at an exhaust stroke, HC, $O_2$, CO and $H_2$ are exhausted into the exhaust passage 16. As ignition timing is delayed, exhaust temperature is high and as the mixture of HC, $O_2$, CO and $H_2$ in the exhaust passage 16 is accelerated by the turbulence generating tool 50 in the exhaust passage 16, the oxidization (the combustion) of HC is rapidly caused in the exhaust passage 16. Hereby, exhaust temperature further rises and the concentration of HC is reduced.

Embodiment of Turbulence Generating Tool

Next, various embodiments of the turbulence generating tool 50 used in the spark ignition engine according to the invention will be described.

Figure 46:
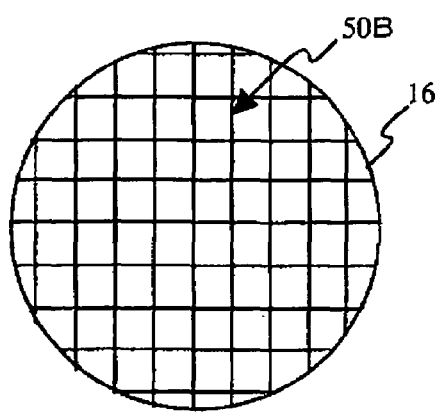
FIG. 46 shows one example of a turbulence generating tool used in the engine according to the invention.
Figure 47:
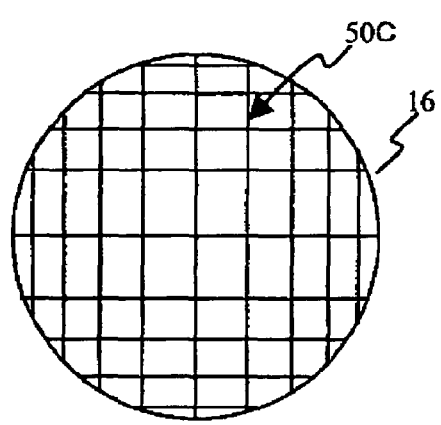
FIG. 47 shows another example of the turbulence generating tool used in the engine according to the invention.

As for a turbulence generating tool SOB shown in FIG. 46, component members (rod members) are arranged in the form of a grid or in the form of a mesh. As for a turbulence generating tool 50C shown in FIG. 47, component members (rod members) are arranged in the form of a grid or in the form of a mesh, however, an interval between the component members (the rod members) is narrowed in the vicinity of the inner wall of the exhaust passage 16. Exhaust temperature lowers in the vicinity of the inner wall of the exhaust passage 16 by heat radiation from the wall, compared with the center of the exhaust passage 16. Therefore, turbulence strength in the vicinity of the wall is enhanced by increasing the density of the component members (the rod members) in the vicinity of the inner wall and the mixture of HC, $O_2$, CO and $H^2$ in the vicinity of the wall is accelerated. Hereby, the deterioration of the reaction velocity of HC caused because exhaust temperature lowers in the vicinity of the wall can be prevented.

Figure 48:
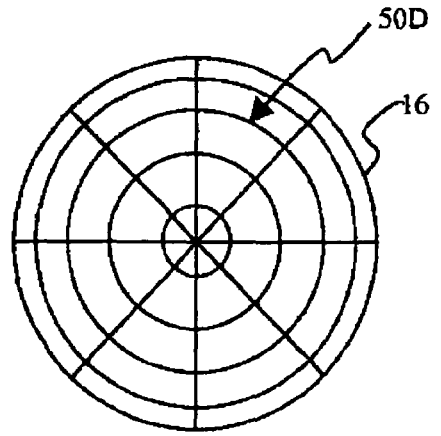
FIG. 48 shows another example of the turbulence generating tool used in the engine according to the invention.

As for a turbulence generating tool 50D shown in FIG. 48, annular members are concentrically arranged to be in the form of a cobweb. In this arrangement, the density of component members in the vicinity of the wall can be more easily changed.

Figure 49:
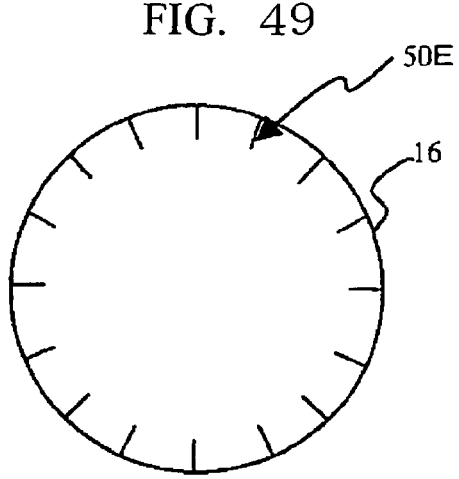
FIG. 49 shows another example of the turbulence generating tool used in the engine according to the invention.

A turbulence generating tool 50E shown in FIG. 49 is configured by plural projections (rods) protruded toward the inside from the inner wall of the exhaust passage 16. The projections are radially arranged at an equal interval. The turbulence generating tool 50E can effectively prevent the velocity of the oxidization of HC in the vicinity of the wall of the exhaust passage 16 from being deteriorated. Owing to its structure, the turbulence generating tool can be cast integrally with the exhaust passage 16 and has a merit that the manufacturing cost is reduced.

Figure 50:
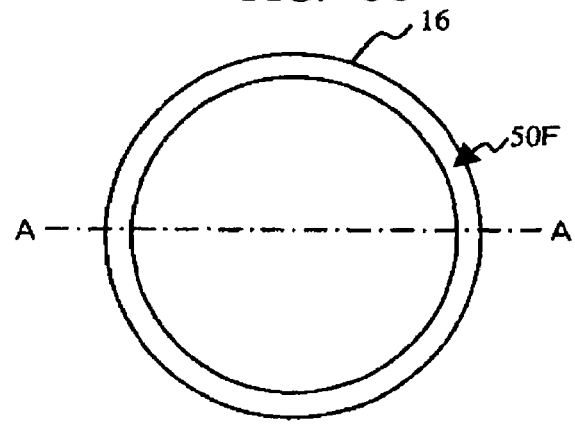
FIG. 50 shows another example of the turbulence generating tool used in the engine according to the invention.
Figure 51:
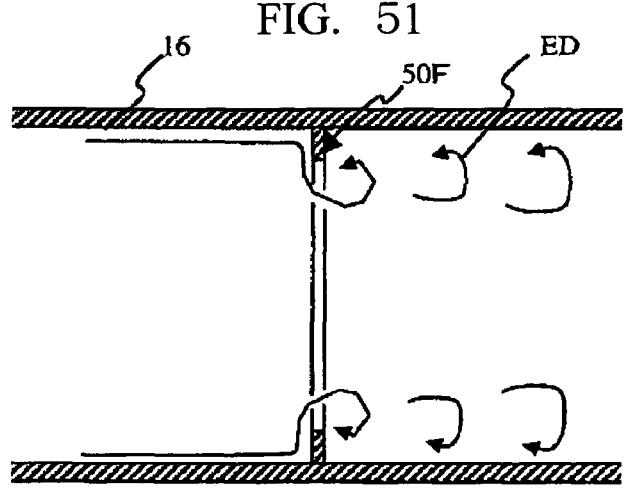
FIG. 51 is a sectional view viewed along line A-A shown in FIG. 50.

A turbulence generating tool 50F shown in FIG. 50 is configured by an annular plate protruded toward the inside from the inner wall of the exhaust passage 16 (also see FIG. 51 which is a sectional view viewed along a line A-A shown in FIG. 50). This turbulence generating tool can also effectively accelerate the oxidization of HC in the vicinity of the wall of the exhaust passage 16. As the turbulence generating tool is configured by the annular plate, its structure strength can be enhanced.

Figure 52:
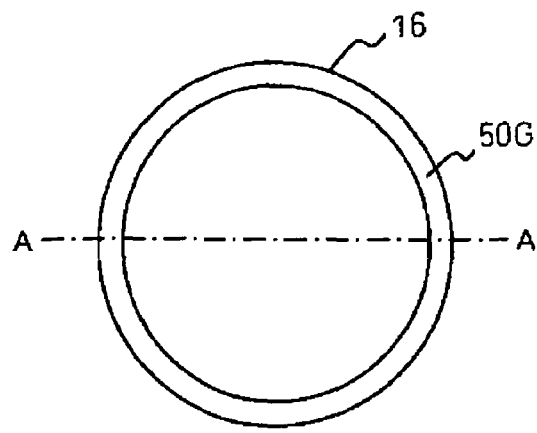
FIG. 52 shows another example of the turbulence generating tool used in the engine according to the invention.
Figure 53:
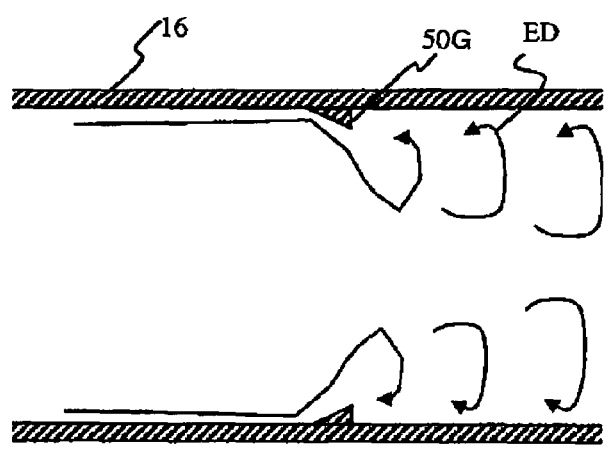
FIG. 53 is a sectional view viewed along line A-A shown in FIG. 52.

A turbulence generating tool 50G shown in FIGS. 52 and 53 is also configured by an annular member protruded toward the inside from the inner wall of the exhaust passage 16, however, the form of its section is triangular. Hereby, turbulence ED is generated in the vicinity of the wall, the oxidization of HC in the vicinity of the wall is accelerated, and the oxidization (the combustion) of HC is accelerated by making HC and $O_2$ flowing along the wall to flow to the center of the exhaust passage 16 the temperature of which is high.

Figure 54:
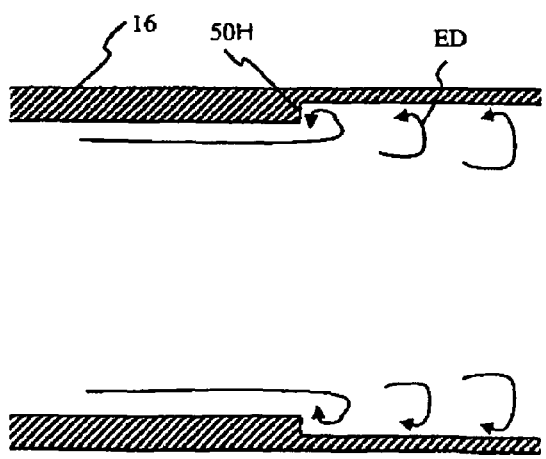
FIG. 54 shows another example of the turbulence generating tool used in the engine according to the invention.

The turbulence generating tool 50H shown in FIG. 54 is formed by difference in a level provided to an inner wall of the exhaust passage 16. In other words, the cross-sectional area of the exhaust passage 16 is expanded in the form of a step, a separation flow is generated at the back of the step, and the turbulence ED is generated.

Figure 55:
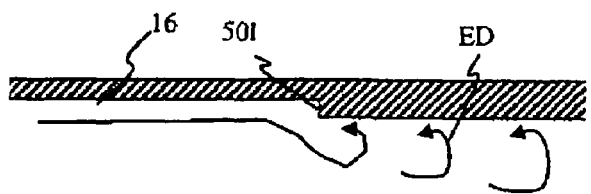
FIG. 55 shows another example of the turbulence generating tool used in the engine according to the invention.

As for a turbulence generating tool 50I shown in FIG. 55, the cross-sectional area of the exhaust passage 16 is narrowed in the form of a step and in this case, a separation flow is also caused in a part of a step, and turbulence ED can be generated.

Figure 56:
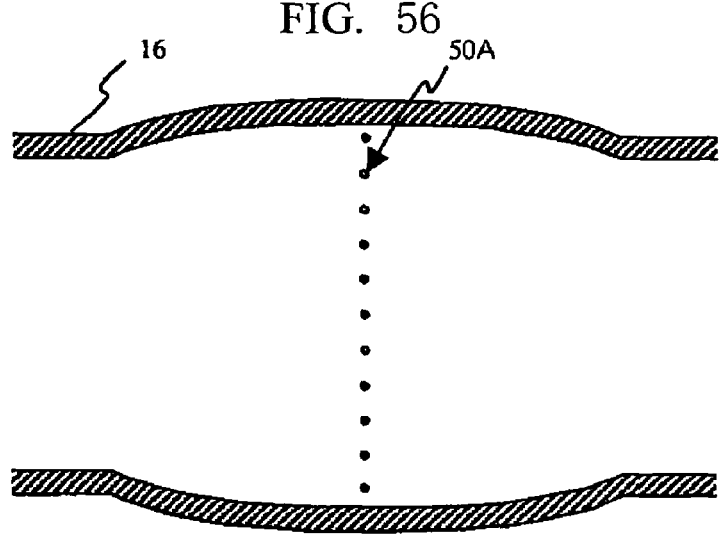
FIG. 56 is a sectional view showing a part in which the turbulence generating tool is arranged in an exhaust passage.

FIG. 56 shows an example in which the cross-sectional area of a part where a turbulence generating tool 50 is provided in the exhaust passage 16 is increased, compared with its front and rear parts. In this example, the increase of exhaust resistance caused by the decrease of the effective cross-sectional area of the exhaust passage 16 by providing the turbulence generating tool 50 in the exhaust passage 16 can be prevented.

FIG. 57 shows an example in which the exhaust passage 16 is formed by a double tube. The decline of exhaust temperature caused by outgoing radiation from the wall of the exhaust passage can be inhibited by providing an airy layer LY between an inner wall 16i and an outer wall 16o and the reaction of HC can be accelerated. Convection in the airy layer LY is inhibited by providing partitions 16s in the airy layer LY and adiabatic effect is more enhanced. When a vacuum layer is provided between the inner wall and the outer wall in place of the airy layer LY, heat conduction by airy convection is eliminated and larger adiabatic effect is acquired.

Figure 58:
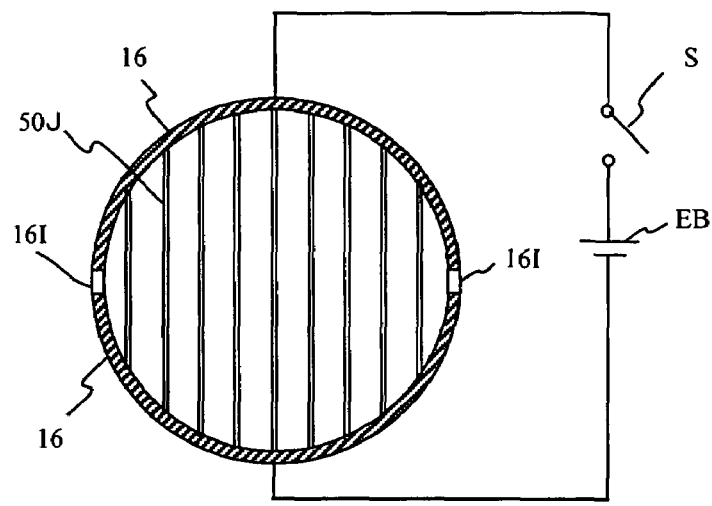
FIG. 58 is a sectional view showing another example of the turbulence generating tool used in the engine according to the invention.
Figure 59:
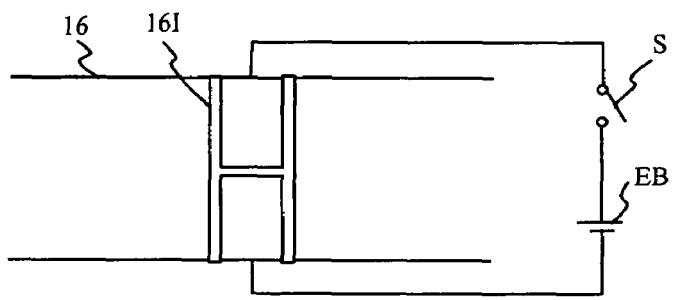
FIG. 59 is a side view showing a turbulence generating tool shown in FIG. 58.

FIGS. 58 and 59 (a side view of FIG. 58) show an example in which a turbulence generating tool 50 (50J) can be heated by electricity. As shown in FIG. 58, the exhaust passage 16 is formed by material having satisfactory electric conductivity and the turbulence generating tool 50J is formed by material having large electrical resistance such as nichrome and tungsten. A reference numeral 161 denotes electrical insulating material. When a switch S is turned on in warming up and voltage is applied to the turbulence generating tool 50J from a battery EB, the temperature of the turbulence generating tool 50J rises because of Joule heat. Hereby, the oxidization of HC in the exhaust passage 16 is accelerated. When the warming up is ended, the switch S is turned off and the vain consumption of power is inhibited.

Figure 60:
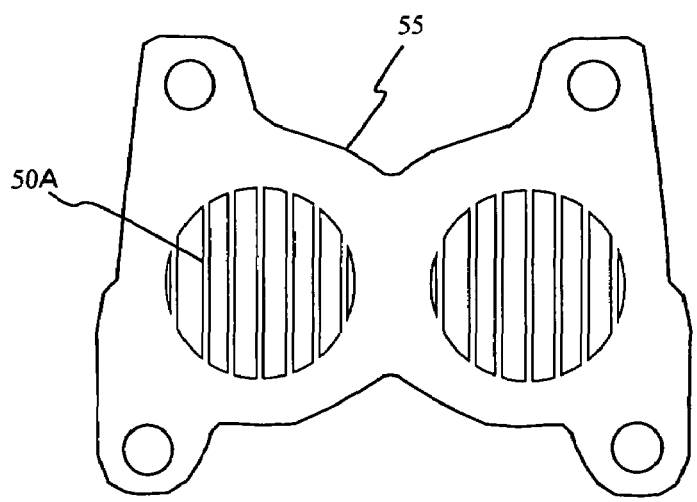
FIG. 60 shows an example in which the turbulence generating tool used in the engine according to the invention is integrated with a gasket.

FIG. 60 shows an example in which the turbulence generating tool 50A is integrated with a gasket 55 inserted between the exhaust passage 16 (the exhaust manifold) and the cylinder head 26. The manufacturing cost can be reduced by integrating the gasket 55 and the turbulence generating tool 50A as described above.

Figure 61:
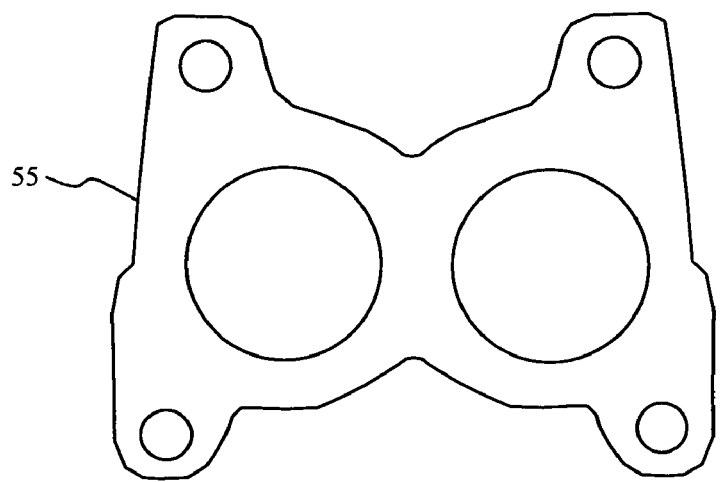
FIG. 61 shows the gasket used in the engine according to the invention.
Figure 62:
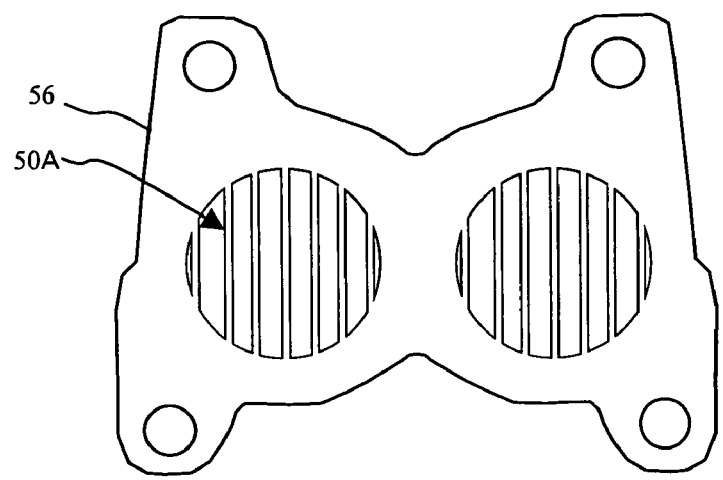
FIG. 62 shows flat structure in which the turbulence generating tool is built.
Figure 63:
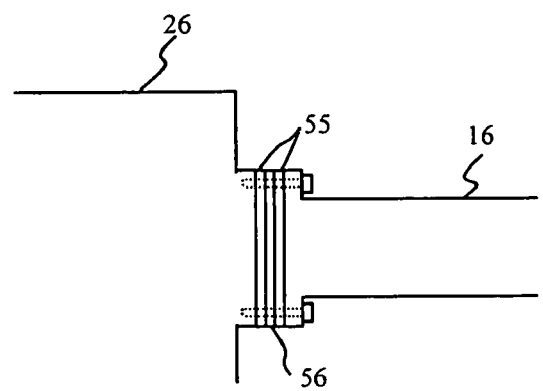
FIG. 63 shows a state in which the flat structure shown in FIG. 62 is inserted between the gaskets shown in FIG. 61.

FIG. 63 shows an example where flat structure 56, provided with the turbulence generating tool 50A as shown in FIG. 62, is held and fixed between a pair of gaskets 55, as shown in FIG. 61, which are inserted between the exhaust passage 16 (the exhaust manifold) and the cylinder head 26. As described above, the turbulence generating tool 50 is easily mounted in the exhaust passage 16 by holding the flat structure 56 with the turbulence generating tool 50A between the two exhaust gaskets 55. As the material of the gasket 55 and the material of the turbulence generating tool 50 can be made separately in this configuration, this configuration has a merit of being easy to manufacture the turbulence generating tool 50 requiring further the heat resistance and the strength, as compared with the gasket 55.

It is desirable that the turbulence generating tool 50A is so sized that turbulence can be efficiently generated in the exhaust passage 16.

Figure 64:
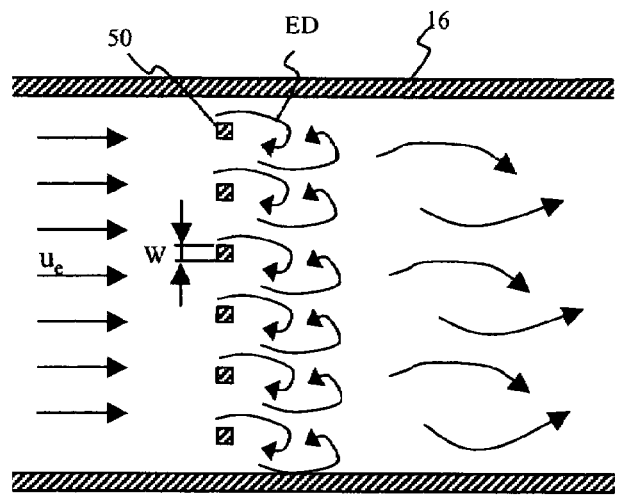
FIG. 64 is a sectional view of the exhaust passage for explaining the definition of the width of component members of the turbulence generating tool.

The generation efficiency of turbulence is determined by the width W of a component member of the turbulence generating tool, exhaust flow velocity $u_e$ in the exhaust passage 16 and the magnitude of Reynolds number $R_e$ using the kinematic coefficient of viscosity v of exhaust gas and defined in the following expression 5 as shown in FIG. 64. When the Reynolds number defined in the expression 5 exceeds a critical Reynolds number $R_{ec}$, a Karman vortex is generated on the side of a wake of the turbulence generating tool 50 and turbulence ED is accelerated. Various experiments have proved that the critical Reynolds number $R_{ec}$ is approximately 100.

$$R_e = \frac{W \cdot u_e}{v} \quad \text{Expression 5}$$

Therefore, the width W of the component member of the turbulence generating tool 50 for generating turbulence ED is determined by the following expression 6. Here, "$u_e$" denotes the mean flow velocity of exhaust in the exhaust passage and in the case of 4-cycle engine, it is acquired in the following expression 7. In the expression 7, $V_c$ denotes cubic capacity per cylinder, $V_T$ denotes the whole cubic capacity, $r_s$ denotes engine speed per second, $N_e$ is engine speed per minute, $n_c$ denotes the number of all cylinders, and $S_e$ denotes the cross-sectional area of the part where the turbulence generating tool 50 is attached in the exhaust passage 16. In the case of the 2-cycle engine, exhaust flow velocity $u_e$ is the double of the result of the expression 7.

$$W > \frac{R_{ec} \cdot v}{u_e} \quad \text{Expression 6}$$

$$u_e = \frac{V_c \cdot r_s}{2S_e} = \frac{V_T \cdot N_e}{120 n_c \cdot S_e} \quad \text{Expression 7}$$

Figure 65:
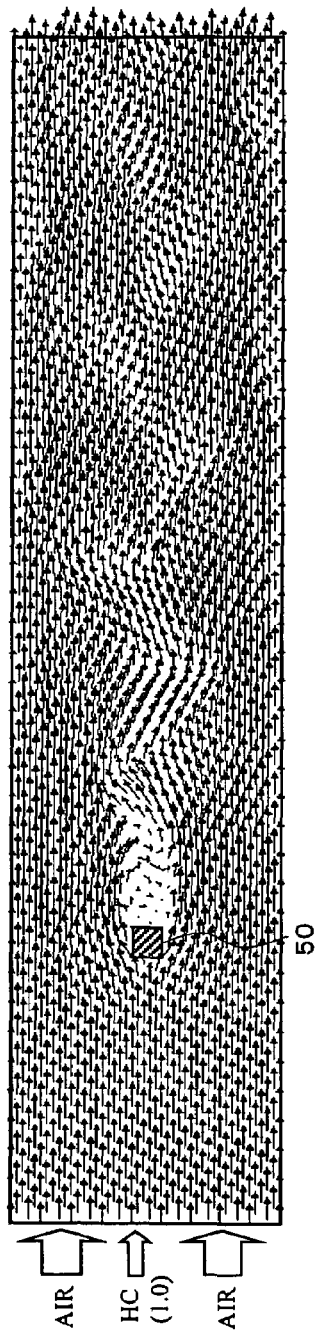
FIG. 65 shows exhaust flow velocity vectors as the results of computer simulation in the exhaust passage equipped with a turbulence generating tool.
Figure 66:
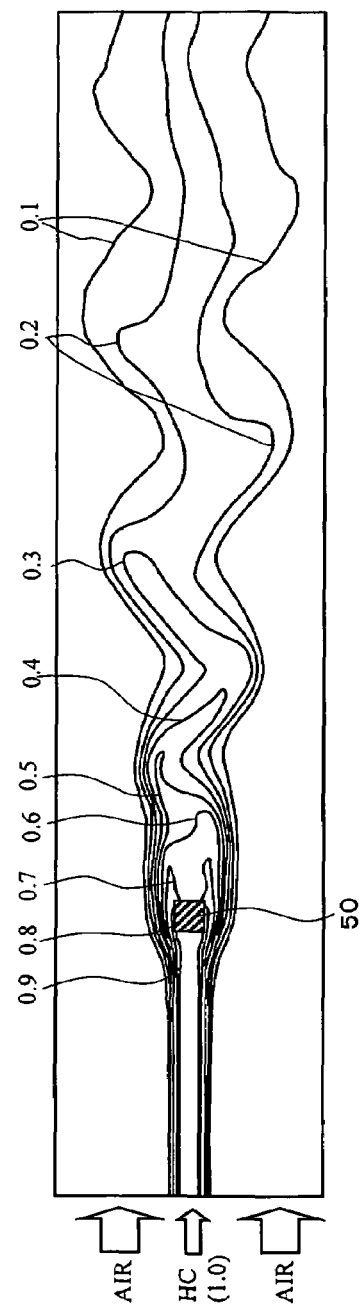
FIG. 66 shows contour lines showing the concentration of HC in non-combustion as the results of computer simulation in the exhaust passage equipped with the turbulence generating tool.
Figure 67:
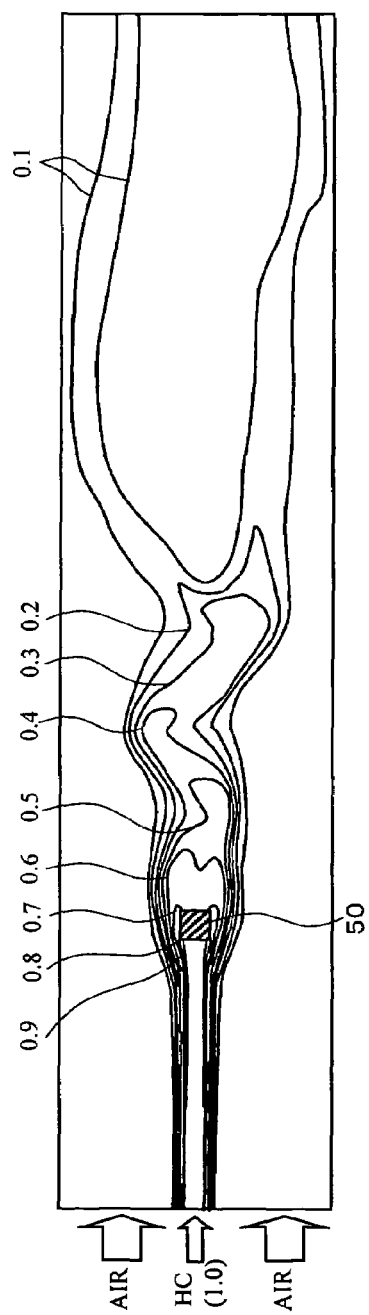
FIG. 67 shows contour lines showing the concentration of HC in combustion as the results of computer simulation in the exhaust passage equipped with the turbulence generating tool.

Next, referring to FIGS. 65 to 67, it is to describe the results of the computer simulation of an exhaust flow in the case where the turbulence generating tool 50 is mounted in the exhaust passage. In computing, the turbulence generating tool 50 (its component member) is set to a square rod 1 square mm and engine speed is set to 1400 r/min. HC (relative concentration: 1.0) flows from the center of the left end and air (the relative concentration of HC: 0) flows from both sides of HC.

In the simulation, a conservation expression of the mass, the momentum and the energy of fuel mixture, as well as a mass conservation expression of HC, a mass conservation expression of combustion gas and an equation of a state of fuel mixture are apposed and the result is acquired by solving them using the finite volume method. The oxidization of HC is modeled in an overall reaction formula and is simulated.

FIG. 65 shows velocity vectors of exhaust gas in the case where the exhaust gas flows in from the left end and flows out from the right end as the results of simulation by a computer.

FIG. 66 shows contour lines showing the relative concentration distribution of HC immediately before the oxidization of HC starts as the results of simulation by a computer. Relative concentration is shown by a mass concentration rate when the concentration of HC flowing from the center of the left end is 1.

FIG. 67 shows contour lines showing the relative concentration distribution of HC after the oxidization of HC starts as the results of computer simulation.

A Karman vortex is generated at the back of the turbulence generating tool 50 (the square rod) from the velocity vectors shown in FIG. 65 and the turbulence of the flow increases.

The mixture of HC and air is accelerated by turbulence at the back of the turbulence generating tool 50 from the HC concentration distribution shown in FIG. 66 before HC is oxidized and the concentration of HC is uniformed.

The oxidization of HC is accelerated by the mixture of HC and air from the HC concentration distribution shown in FIG. 67 after HC is oxidized and the concentration of HC in a downstream part rapidly decreases.

Figure 68:
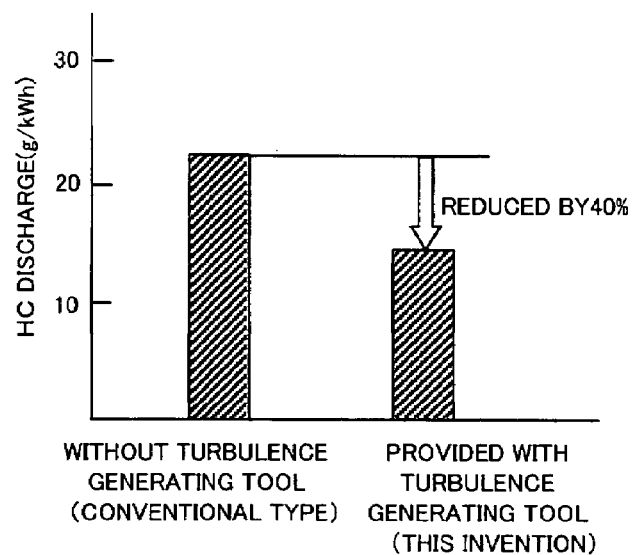
FIG. 68 shows the results of the measurement of the concentration of HC in the exhaust passage in a bench test using an actual engine.

FIG. 68 shows the results of the measurement of HC concentration in the exhaust passage by a bench test using the real engine.

The engine used for the test is a 4-cylinder direct injection-type spark ignition engine, the swept volume of which is 1800 cm³.

As for a condition of the test, engine speed is set to 1400 r/min, mean effective pressure is set to 200 kPa, air-fuel ratio is set to 16, fuel injection timing is set to 52° BTDC (before a top dead center), ignition timing is set to 8° BTDC, and the temperature of cooling water is set to 20° C.

The turbulence generating tool is mounted on the gasket to be inserted between the cylinder head and the exhaust manifold (see FIG. 60). The concentration of HC is measured in a position by approximately 50 mm downstream from the exhaust manifold.

Figure 69:
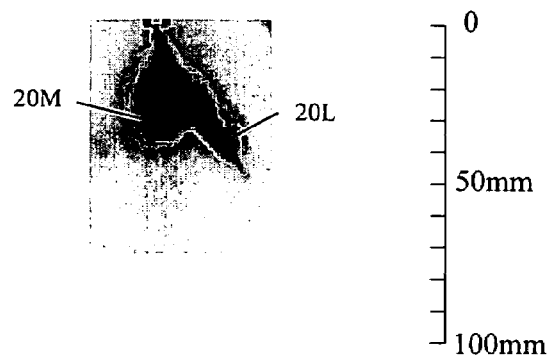
FIG. 69 shows a longitudinal tomogram showing fuel spray used in a bench test of the direct injection-type spark ignition engine.

FIG. 69 shows a longitudinal tomogram of fuel spray used in the bench test of the direct injection-type spark ignition engine. As for measurement, the section of the center of fuel spray injected with injection pulse width of 1.3 msec under fuel pressure of 7 MPa in static nitrogen atmosphere (temperature: 20° C.) pressurized at 0.5 MPa is visualized by laser sheet light and is photographed by a high speed camera. Observation timing is 2.2 msec after injection is started.

The concentration of HC in the case where the turbulence generating tool is mounted in the exhaust passage is reduced by approximately 40% in view of the results shown in FIG. 68, as compared with the case that no turbulence generating tool is mounted. Hereby, the oxidization of HC in the exhaust passage is accelerated by providing the turbulence generating tool in the exhaust passage and HC in the exhaust passage can be reduced.

Next, referring to FIGS. 70 and 71, correlation of time interval between fuel injection and ignition with concentration of HC and smoke will be described.

Figure 70:
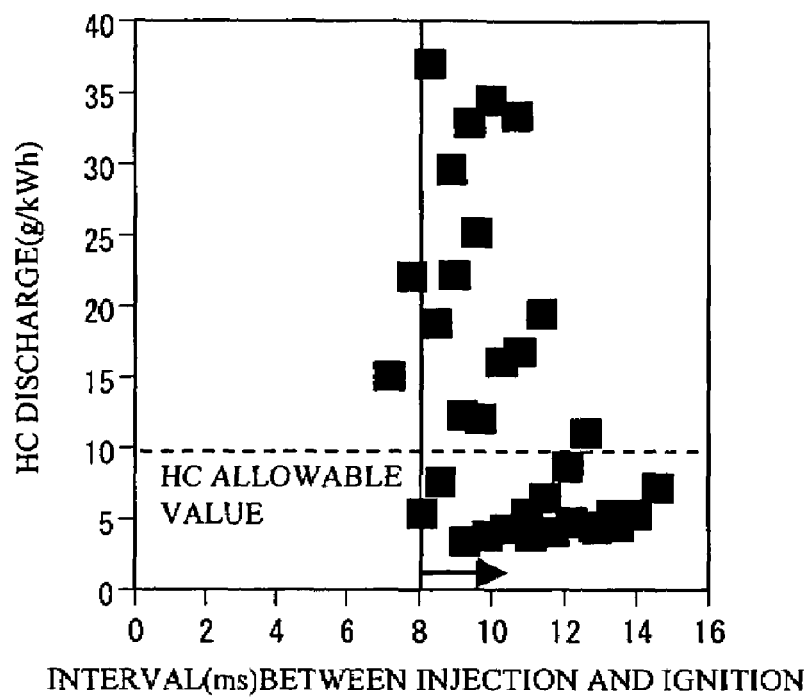
FIG. 70 shows correlation of the time interval between injection timing of fuel and ignition timing with the discharge of HC as the results of the measurement of HC concentration using a real spark ignition engine of the direct injection-type according to the invention at the time of warming up operation.

FIG. 70 shows correlation of time interval between the injection initiation timing of fuel and ignition timing with the result in a bench test of concentration of HC.

Figure 71:
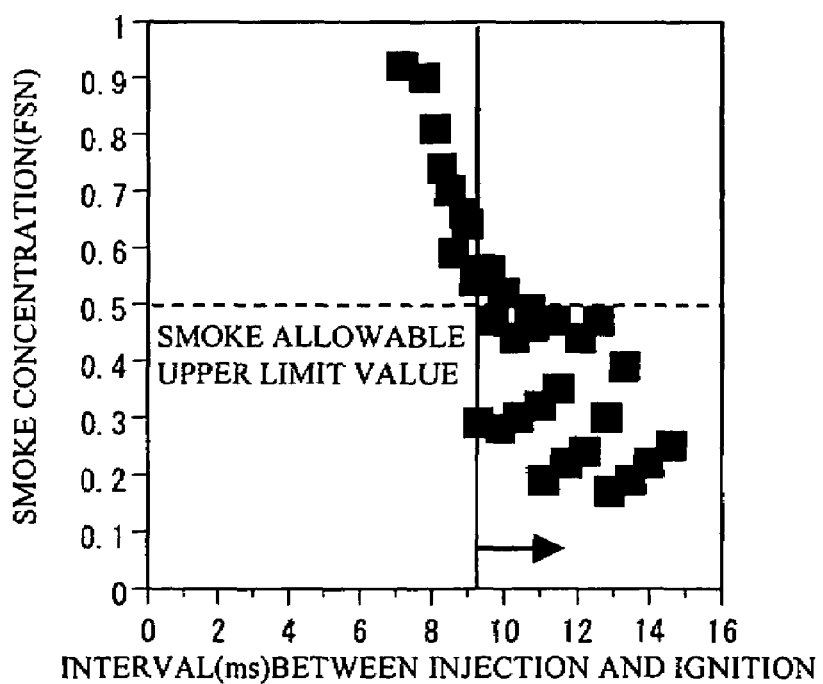
FIG. 71 shows correlation of the time interval between injection timing of fuel and ignition timing with the smoke concentration as the results of the measurement of smoke concentration using a real spark ignition engine of the direct injection-type according to the invention at the time of warming up operation.

FIG. 71 shows correlation of time interval between injection initiation timing of fuel and ignition timing with the result in a bench test of concentration of smoke.

An engine used in the test of HC concentration and smoke concentration shown in FIGS. 70 and 71 is a DOHC 4-cylinder direct injection-type spark ignition engine, the swept volume of which is 2000 cm$^3$.

For a condition of the test, engine speed is set to 1200 rpm, mean effective pressure is set to 250 kPa, the temperature of cooling water of the engine is set to 40° C., fuel pressure is set to 9 MPa, and air-fuel ratio is set to 15. Fuel injection timing is set to 80° to 48° BTDC (the initiation of injection) and ignition timing is set to 0° to 25° ATDC (after a top dead center).

FIGS. 70 and 71 show that a time interval since the injection initiation timing of fuel till ignition timing and the concentration of HC and smoke have strong correlation and as the time interval since the injection initiation timing of fuel till ignition timing is longer, the concentration of HC and smoke has a tendency to decrease.

As ignition timing is delayed when the time interval since the injection initiation timing of fuel till ignition timing is extended, the oxidization of HC in the exhaust passage is accelerated and the concentration of HC decreases.

Besides, as the vaporization of fuel is accelerated when time interval between the injection initiation timing of fuel and ignition timing is extended, the concentration of smoke decreases.

FIG. 70 shows that the concentration of HC can be made an allowable upper limit value or less by setting the time interval between the injection initiation timing of fuel and ignition timing to 8 ms or longer.

FIG. 71 shows that the concentration of smoke can be made an allowable upper limit value or less by setting time interval between the injection initiation timing of fuel and ignition timing to 9 ms or longer.

That is, both the concentration of HC and the concentration of smoke can be made on or under the allowable upper limit by setting time interval between the injection initiation timing of fuel and the ignition timing to 9 ms or longer.

INDUSTRIAL APPLICABILITY

According to the spark ignition engine and the method of controlling combustion of the engine related to the invention, as understood from the above-mentioned description, at the time of warming up operation in which the temperature of the engine is low, ignition timing is delayed, as compared with that in normal operation, to generate turbulence in an exhaust flow including a large quantity of unburned HC, oxygen and carbon monoxide and to accelerate the mixture of them so that HC is combusted in the exhaust passage to raise the exhaust temperature as well as to reduce effectively HC, and further the high temperature of the exhaust enables to activate early a catalytic converter for purifying exhaust.

The invention claimed is:

1. A spark ignition engine, comprising:
   combustion control means for controlling ignition timing by an ignition plug; and
   turbulence generating means for generating turbulence in an exhaust flow in an exhaust passage, wherein:
   the combustion control means makes ignition timing immediately before a compression stroke top dead center or later in the case where the temperature of the engine is lower than the predetermined temperature.

2. A spark ignition engine according to claim 1, comprising:
   fuel stratifying means for stratifying fuel in a combustion chamber, wherein:
   the combustion control means instructs the fuel stratifying means to layer fuel in the combustion chamber in the case where the temperature of the engine is lower than the predetermined temperature.

3. A spark ignition engine according to claim 1, comprising:
   a fuel injection valve for directly injecting fuel into the combustion chamber, wherein:
   the combustion control means instructs the fuel injection valve to inject fuel at a compression stroke in the case where the temperature of the engine is lower than the predetermined temperature.

4. A spark ignition engine according to claim 3, wherein:
   time interval between the latest fuel injection initiation timing and ignition initiation timing is 9 ms or longer.

5. A spark ignition engine according to claim 1, comprising:
   a fuel injection valve for injecting fuel into an intake port, wherein:
   said combustion control means instructs the fuel injection valve to inject fuel at an intake stroke in the case where the temperature of the engine is lower than the predetermined temperature.

6. A spark ignition engine according to claim 1, wherein:
   said turbulence generating means is mounted in an exhaust passage at the position where the exhaust temperature in warming-up operation is 600° C. or higher.

7. A spark ignition engine according to claim 1, wherein:
   said turbulence generating means is mounted in an exhaust passage at the position which is within 500 mm downstream from the most upstream part of the exhaust passage.

8. A spark ignition engine according to claim 1, wherein:
   the cross-sectional area of an exhaust passage in the vicinity of said turbulence generating means mounted therein, is made larger than at least the cross-sectional area of upstream part of the passage.

9. A spark ignition engine according to claim 1, wherein:
   said turbulence generating means is configured by plural rods or plural plates arranged in parallel so that they cross the exhaust passage.

10. A spark ignition engine according to claim 9, wherein:
    the interval between component members of said turbulence generating means is narrower on the wall side, as compared with that in the center of the exhaust passage.

11. A spark ignition engine according to claim 9, wherein:
    said turbulence generating means is integrated with a gasket arranged between the exhaust passage and a cylinder head.

12. A spark ignition engine according to claim 9, wherein:
    said turbulence generating means is held between or positioned adjacently to gaskets arranged between the exhaust passage and a cylinder head.

13. A spark ignition engine according to claim 9, wherein:
    said turbulence generating means can be electrically heated.

14. A spark ignition engine according to claim 9, wherein:
    said turbulence generating means is arranged so that the width of the component member is $Rec \cdot v/Ue$ or more, where $Rec$ is the critical Reynolds number at which a Karman vortex is generated, Ue is the mean exhaust velocity in the exhaust passage in warming-up operation and v is the kinematic coefficient of viscosity of exhaust gas.

15. A spark ignition engine according to claim 1, wherein:
said turbulence generating means is configured in the form of a grid or a cobweb.

16. A spark ignition engine according to claim 1, wherein:
said turbulence generating means is configured by plural projections or annular members protruded inwardly from an inner wall of the exhaust passage.

17. A spark ignition engine according to claim 1, wherein:
said turbulence generating means is configured by a step mounted on an inner wall of the exhaust passage.

18. A spark ignition engine, comprising:
turbulence generating means for generating turbulence in an exhaust flow in an exhaust passage;
a fuel injection valve for directly injecting fuel into a combustion chamber; and
fuel injection control means for controlling fuel injection timing by the fuel injection valve, wherein:
the fuel injection control means instructs the fuel injection valve to inject fuel at an expansion stroke in the case where the temperature of the engine is lower than the predetermined temperature.

19. A spark ignition engine, comprising:
ignition timing control means for controlling ignition timing by an ignition plug;
a fuel injection valve for directly injecting fuel into a combustion chamber; and
fuel injection control means for controlling fuel injection timing by the fuel injection valve, wherein:
the penetration of fuel spray injected from the fuel injection valve in the direction of an ignition plug is made longer than that in the direction of a piston;
in the case where the temperature of the engine is lower than the predetermined temperature, the fuel injection control means instructs the fuel injection valve to inject fuel in the second half of a compression stroke so that the air-fuel ratio is in the vicinity of the theoretical air-fuel ratio; and
the ignition timing control means makes ignition timing immediately before a compression stroke top dead center or later.

20. A spark ignition engine according to claim 19, comprising:
turbulence generating means for generating turbulence in an exhaust flow in the exhaust passage.

21. A spark ignition engine, comprising:
ignition timing control means for controlling ignition timing by an ignition plug;
a fuel injection valve for directly injecting fuel into a combustion chamber;
fuel injection control means for controlling fuel injection timing by the fuel injection valve; and
longitudinal vortex generating means for generating a forward longitudinal vortex in a combustion chamber, wherein:
in the case where the temperature of the engine is lower than the predetermined temperature, the longitudinal vortex generating means generates a forward longitudinal vortex in the combustion chamber;
the fuel injection control means instructs the fuel injection valve to inject fuel in the second half of a compression stroke so that the air-fuel ratio is in the vicinity of the theoretical air-fuel ratio; and
the ignition timing control means makes ignition timing immediately before a compression stroke top dead center or later.

22. A spark ignition engine according to claim 21, comprising:
longitudinal vortex controlling means for controlling the strength of a forward longitudinal vortex generated in the combustion chamber; and
fluctuation detecting means for detecting the magnitude of the fluctuation of engine speed or torque fluctuation, wherein:
the longitudinal vortex controlling means controls the strength of the longitudinal vortex so that the magnitude of the fluctuation of engine speed or torque fluctuation is a predetermined value or less; and
the ignition timing control means delays ignition timing to the extent possible.

23. A spark ignition engine, comprising:
ignition timing control means for controlling ignition timing by an ignition plug;
a fuel injection valve for directly injecting fuel into a combustion chamber;
fuel injection control means for controlling fuel injection timing by the fuel injection valve; and
longitudinal vortex generating means for generating a forward longitudinal vortex in the combustion chamber, wherein:
the penetration of fuel spray injected from the fuel injection valve in the direction of an ignition plug is made longer than that in the direction of a piston;
in the case where the temperature of the engine is lower than the predetermined temperature, the longitudinal vortex generating means generates a forward longitudinal vortex in the combustion chamber;
the fuel injection control means instructs the fuel injection valve to inject fuel in the second half of a compression stroke so that the air-fuel ratio is in the vicinity of the theoretical air-fuel ratio; and
the ignition timing control means makes ignition timing immediately before a compression stroke top dead center or later.

24. A spark ignition engine according to claim 23, comprising:
longitudinal vortex controlling means for controlling the strength of a forward longitudinal vortex generated in the combustion chamber; and
fluctuation detecting means for detecting the magnitude of the fluctuation of engine speed or torque fluctuation, wherein:
the longitudinal vortex controlling means controls the strength of the longitudinal vortex so that the magnitude of the fluctuation of engine speed or torque fluctuation is a predetermined value or less; and
the ignition timing control means delays ignition timing to the extent possible.

25. A spark ignition engine, comprising:
ignition timing control means for controlling ignition timing by an ignition plug;
a fuel injection valve for directly injecting fuel into a combustion chamber;
fuel injection control means for controlling fuel injection timing by the fuel injection valve;
fuel pressure controlling means for controlling the pressure of fuel supplied to the fuel injection valve; and
fluctuation detecting means for detecting the magnitude of the fluctuation of engine speed or torque fluctuation, wherein:

in the case where the temperature of the engine is lower than the predetermined temperature, the fuel injection control means instructs the fuel injection valve to inject fuel in the second half of a compression stroke so that the air-fuel ratio is in the vicinity of the theoretical air-fuel ratio;

the fuel pressure controlling means controls fuel pressure so that the magnitude of the fluctuation of engine speed or torque fluctuation is a predetermined value or less; and the ignition timing control means delays ignition timing to the extent possible.

26. A combustion control method of a spark ignition engine, comprising the steps of:

generating turbulence in an exhaust flow in an exhaust passage, and causing ignition timing to occur immediately before a compression stroke top dead center or later in the case where a temperature of the engine is lower than a predetermined temperature.

27. A combustion control method according to claim 26, further comprising the step of instructing to stratify fuel in the combustion chamber in the case where the temperature of the engine is lower than the predetermined temperature.

28. A combustion control method according to claim 26, further comprising the step of injecting fuel in a compression stroke in the case where the temperature of the engine is lower than the predetermined temperature.

29. A combustion control method according to claim 28, further comprising the step of:

setting a time interval between a latest fuel injection initiation timing and an ignition initiation timing to 9 ms or more.

30. A combustion control method according to claim 26, further comprising the steps of:

injecting fuel into an intake port; and in the case where the temperature of the engine is lower than the predetermined temperature, injecting fuel in an intake stroke.

31. A combustion control method of a spark ignition engine, comprising the steps of:

generating turbulence in an exhaust flow in an exhaust passage;

injecting fuel directly into a combustion chamber; and injecting fuel in an expansion stroke in the case where a temperature of the engine is lower than a predetermined temperature.

32. A combustion control method of a spark ignition engine, comprising the steps of:

causing penetration of injected fuel spray in a direction of an ignition plug longer than that in a direction of a piston;

in the case where a temperature of the engine is lower than a predetermined temperature, injectings fuel in a second half of a compression stroke so that an air-fuel ratio is in a vicinity of a theoretical air-fuel ratio; and causing ignition timing to occur immediately before a compression stroke top dead center or later.

33. A combustion control method of a spark ignition engine, comprising the steps of:

in the case where a temperature of the engine is lower than a predetermined temperature, generating a forward longitudinal vortex in a combustion chamber; injecting fuel in a second half of a compression stroke so that an air-fuel ratio is in a vicinity of a theoretical air-fuel ratio; and causing ignition timing to occur immediately before a compression stroke top dead center or later.

34. A combustion control method according to claim 33, comprising the steps of:

regulating the strength of a forward longitudinal vortex generated in a combustion chamber so that a magnitude of a fluctuation of engine speed or torque fluctuation is a predetermined value or less; and delaying ignition timing to an extent possible.

35. A combustion control method of a spark ignition engine, comprising the steps of:

causing penetration of injected fuel spray in a direction of an ignition plug longer than that in the direction of a piston;

in the case where a temperature of the engine is lower than a predetermined temperature, generating a forward longitudinal vortex in a combustion chamber;

injecting fuel in a second half of a compression stroke so that an air-fuel ratio is in a vicinity of a theoretical air-fuel ratio; and causing ignition timing to occur immediately before or later than a compression stroke top dead center.

36. A combustion control method of a spark ignition engine, comprising the steps of:

in the case where a temperature of the engine is lower than a predetermined temperature, injecting fuel in a second half of a compression stroke so that an air-fuel ratio is in a vicinity of a theoretical air-fuel ratio;

regulating an injection pressure of fuel so that a magnitude of a fluctuation of engine speed or torque fluctuation is a predetermined value or less; and delaying ignition timing to an extent possible.

* * * * *

UNITED STATES PATENT AND TRADEMARK OFFICE
CERTIFICATE OF CORRECTION

PATENT NO. : 7,377,261 B2
APPLICATION NO. : 10/568184
DATED : May 27, 2008
INVENTOR(S) : Y. Sukegawa et al.

It is certified that error appears in the above-identified patent and that said Letters Patent is hereby corrected as shown below:

IN THE CLAIMS

Column 33, line 28, through column 34, line 49, the claims should read:

29. A combustion control method ~~according to claim 28, further~~ <u>of a spark ignition engine,</u> comprising the step<u>s</u> of:
<u>generating turbulence in an exhaust flow in an exhaust passage;</u>
<u>injecting fuel directly into a combustion chamber; and</u>
<u>injecting fuel in an expansion stroke in the case where a temperature of the engine is lower than a predetermined temperature.</u>
~~setting a time interval between a latest fuel injection initiation timing and an ignition initiation timing to 9 ms or more~~.

30. A combustion control method ~~according to claim 26, further~~ <u>of a spark ignition engine,</u> comprising the steps of:
<u>causing penetration of injected fuel spray in a direction of an ignition plug longer than that in a direction of a piston;</u>
<u>in the case where a temperature of the engine is lower than a predetermined temperature, injecting fuel in a second half of a compression stroke so that an air-fuel ratio is in a vicinity of a theoretical air-fuel ratio; and</u>
<u>causing ignition timing to occur immediately before a compression stroke top dead center or later.</u>
~~injecting fuel into an intake port;~~
~~and in the case where the temperature of the engine is lower than the predetermined temperature, injecting fuel in an intake stroke.~~

31. A combustion control method of a spark ignition engine, comprising the steps of:
<u>in the case where a temperature of the engine is lower than a predetermined temperature, generating a forward longitudinal vortex in a combustion chamber;</u>

UNITED STATES PATENT AND TRADEMARK OFFICE
CERTIFICATE OF CORRECTION

PATENT NO. : 7,377,261 B2
APPLICATION NO. : 10/568184
DATED : May 27, 2008
INVENTOR(S) : Y. Sukegawa et al.

It is certified that error appears in the above-identified patent and that said Letters Patent is hereby corrected as shown below:

IN THE CLAIMS

<u>injecting fuel in a second half of a compression stroke so that an air-fuel ratio is in a vicinity of a theoretical air-fuel ratio; and</u>
<u>causing ignition timing to occur immediately before a compression stroke top dead center or later.</u>
~~generating turbulence in an exhaust flow in an exhaust passage;~~
~~injecting fuel directly into a combustion chamber; and~~
~~injecting fuel in an expansion stroke in the case where a temperature of the engine is lower than a predetermined temperature.~~

32. A combustion control method of a spark ignition engine, comprising the steps of:
  causing penetration of injected fuel spray in a direction of an ignition plug longer than that in a direction of a piston;
  in the case where a temperature of the engine is lower than a predetermined temperature, <u>generating a forward longitudinal vortex in a combustion chamber;</u>
  injecting~~s~~ fuel in a second half of a compression stroke so that an air-fuel ratio is in a vicinity of a theoretical air-fuel ratio; and
  causing ignition timing to occur immediately before a compression stroke top dead center or later.

33. A combustion control method ~~of a spark ignition engine~~<u>according to Claim 31,</u> comprising the steps of:
  <u>regulating the strength of a forward longitudinal vortex generated in a combustion chamber so that a magnitude of a fluctuation of engine speed or torque fluctuation is a predetermined value or less; and</u>
  <u>delaying ignition timing to an extent possible.</u>
  ~~in the case where a temperature of the engine is lower than a predetermined temperature, generating a forward longitudinal vortex in a combustion chamber;~~
  ~~injecting fuel in a second half of a compression stroke so that an air-fuel ratio is in a vicinity of a theoretical air-fuel ratio; and~~
  ~~causing ignition timing to occur immediately before a compression stroke top dead center or later.~~

UNITED STATES PATENT AND TRADEMARK OFFICE
CERTIFICATE OF CORRECTION

| | |
|---|---|
| PATENT NO. | : 7,377,261 B2 |
| APPLICATION NO. | : 10/568184 |
| DATED | : May 27, 2008 |
| INVENTOR(S) | : Y. Sukegawa et al. |

It is certified that error appears in the above-identified patent and that said Letters Patent is hereby corrected as shown below:

IN THE CLAIMS

34. A combustion control method ~~according to claim 33~~ of a spark ignition engine, comprising the steps of:
    in the case where a temperature of the engine is lower than a predetermined temperature, injecting fuel in a second half of a compression stroke so that an air-fuel ratio is in a vicinity of a theoretical air-fuel ratio;
    regulating an injection pressure of fuel so that a magnitude of a fluctuation of engine speed or torque fluctuation is a predetermined value or less; and
    delaying ignition timing to an extent possible.
    ~~regulating the strength of a forward longitudinal vortex generated in a combustion chamber so that a magnitude of a fluctuation of engine speed or torque fluctuation is a predetermined value or less; and~~
    ~~delaying ignition timing to an extent possible.~~

35. A combustion control method ~~of a spark ignition engine~~ according to Claim 28, further comprising the steps ~~of~~:
    setting a time interval between a latest fuel injection initiation timing and an ignition initiation timing to 9 ms or more.
    ~~causing penetration of injected fuel spray in a direction of an ignition plug longer than that in the direction of a piston;~~
    ~~in the case where a temperature of the engine is lower than a predetermined temperature, generating a forward longitudinal vortex in a combustion chamber;~~
    ~~injecting fuel in a second half of a compression stroke so that an air-fuel ratio is in a vicinity of a theoretical air-fuel ratio; and~~
    ~~causing ignition timing to occur immediately before or later than a compression stroke top dead center.~~

UNITED STATES PATENT AND TRADEMARK OFFICE
CERTIFICATE OF CORRECTION

PATENT NO. : 7,377,261 B2
APPLICATION NO. : 10/568184
DATED : May 27, 2008
INVENTOR(S) : Y. Sukegawa et al.

It is certified that error appears in the above-identified patent and that said Letters Patent is hereby corrected as shown below:

IN THE CLAIMS

36. A combustion control method ~~of a spark ignition engine,~~ <u>according to Claim 26, further</u> comprising the steps of:
  <u>injecting fuel into an intake port; and</u>
  in the case where the temperature of the engine is lower than the predetermined temperature, injecting fuel in <u>an intake stroke.</u> ~~a second half of a compression stroke so that an air-fuel ratio is in a vicinity of a theoretical air-fuel ratio;~~
  ~~regulating an injection pressure of fuel so that a magnitude of a fluctuation of engine speed or torque fluctuation is a predetermined value or less; and~~
  ~~delaying ignition timing to an extent possible.~~

Signed and Sealed this

Second Day of September, 2008

JON W. DUDAS
*Director of the United States Patent and Trademark Office*